(12) United States Patent
Siminoff et al.

(10) Patent No.: US 10,419,727 B2
(45) Date of Patent: Sep. 17, 2019

(54) DIRECTIONAL CONTROL OF AUDIO/VIDEO RECORDING AND COMMUNICATION DEVICES IN NETWORK COMMUNICATION WITH ADDITIONAL CAMERAS

(71) Applicant: Amazon Technologies, Inc., Seattle, CA (US)

(72) Inventors: James Siminoff, Pacific Palisades, CA (US); Mark Siminoff, Mountain View, CA (US); Elliott Lemberger, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/997,606

(22) Filed: Jun. 4, 2018

(65) Prior Publication Data

US 2018/0359451 A1    Dec. 13, 2018

Related U.S. Application Data

(60) Provisional application No. 62/522,418, filed on Jun. 20, 2017, provisional application No. 62/516,430, filed on Jun. 7, 2017.

(51) Int. Cl.
*H04N 7/18* (2006.01)
*H04N 5/232* (2006.01)
(Continued)

(52) U.S. Cl.
CPC .......... *H04N 7/186* (2013.01); *H04M 11/025* (2013.01); *H04N 5/23206* (2013.01);
(Continued)

(58) Field of Classification Search
CPC ...... H04N 7/186; H04N 5/23206; H04N 5/33; H04N 7/155; H04M 11/025; H04M 3/42221; H04M 3/567
See application file for complete search history.

(56) References Cited

U.S. PATENT DOCUMENTS

| 4,764,953 A | 8/1988 | Chern et al. |
| 5,428,388 A | 6/1995 | von Bauer et al. |

(Continued)

FOREIGN PATENT DOCUMENTS

| CN | 2585521 Y | 11/2003 |
| CN | 2792061 Y | 6/2006 |

(Continued)

*Primary Examiner* — Phung-Hoang J Nguyen
(74) *Attorney, Agent, or Firm* — Chong IP Law, LLP

(57) ABSTRACT

Direction control of audio/video (A/V) recording and communication devices in network communication with additional cameras is provided. In one embodiment, an A/V recording and communication device comprises: a first camera configured to capture first image data, wherein the first camera is pointed in a first direction; a communication module; and a processing module comprising: a processor; and a camera application that configures the processor to: maintain the first camera in a low-power state; receive a power-up command signal from the backend server based on an output signal from a second camera; receive an orientation signal from the backend server based on the output signal from the second camera; point the first camera in a second direction in response to the orientation signal; power up the first camera in response to the power-up command signal; and capture the first image data in response to the power-up command signal.

20 Claims, 20 Drawing Sheets

(51) Int. Cl.
*H04N 5/33* (2006.01)
*H04M 11/02* (2006.01)
*H04N 7/15* (2006.01)
*H04M 3/56* (2006.01)
*H04M 3/42* (2006.01)

(52) U.S. Cl.
CPC .......... *H04N 5/33* (2013.01); *H04M 3/42221* (2013.01); *H04M 3/567* (2013.01); *H04N 7/155* (2013.01)

(56) References Cited

U.S. PATENT DOCUMENTS

| | | | |
|---|---|---|---|
| 5,760,848 | A | 6/1998 | Cho |
| 6,072,402 | A | 6/2000 | Kniffin et al. |
| 6,192,257 | B1 | 2/2001 | Ray |
| 6,271,752 | B1 | 8/2001 | Vaios |
| 6,429,893 | B1 | 8/2002 | Xin |
| 6,456,322 | B1 | 9/2002 | Marinacci |
| 6,476,858 | B1 | 11/2002 | Ramirez Diaz et al. |
| 6,633,231 | B1 | 10/2003 | Okamoto et al. |
| 6,658,091 | B1 | 12/2003 | Naidoo et al. |
| 6,753,774 | B2 | 6/2004 | Pan et al. |
| 6,970,183 | B1 | 11/2005 | Monroe |
| 7,062,291 | B2 | 6/2006 | Ryley et al. |
| 7,065,196 | B2 | 6/2006 | Lee |
| 7,085,361 | B2 | 8/2006 | Thomas |
| 7,109,860 | B2 | 9/2006 | Wang |
| 7,193,644 | B2 | 3/2007 | Carter |
| 7,304,572 | B2 | 12/2007 | Sheynman et al. |
| 7,382,249 | B2 | 6/2008 | Fancella |
| 7,450,638 | B2 | 11/2008 | Iwamura |
| 7,643,056 | B2 | 1/2010 | Silsby |
| 7,683,924 | B2 | 3/2010 | Oh et al. |
| 7,683,929 | B2 | 3/2010 | Elazar et al. |
| 7,738,917 | B2 | 6/2010 | Ryley et al. |
| 8,139,098 | B2 | 3/2012 | Carter |
| 8,144,183 | B2 | 3/2012 | Carter |
| 8,154,581 | B2 | 4/2012 | Carter |
| 8,619,136 | B2 | 12/2013 | Howarter et al. |
| 8,872,915 | B1 | 5/2014 | Scalisi et al. |
| 8,780,201 | B1 | 7/2014 | Scalisi et al. |
| 8,823,795 | B1 | 9/2014 | Scalisi et al. |
| 8,842,180 | B1 | 9/2014 | Kasmir et al. |
| 8,937,659 | B1 | 1/2015 | Scalisi et al. |
| 8,941,736 | B1 | 1/2015 | Scalisi |
| 8,947,530 | B1 | 2/2015 | Scalisi |
| 8,953,040 | B1 | 2/2015 | Scalisi et al. |
| 9,013,575 | B2 | 4/2015 | Scalisi |
| 9,049,352 | B2 | 6/2015 | Scalisi et al. |
| 9,053,622 | B2 | 6/2015 | Scalisi |
| 9,058,738 | B1 | 6/2015 | Scalisi |
| 9,060,103 | B2 | 6/2015 | Scalisi |
| 9,060,104 | B2 | 6/2015 | Scalisi |
| 9,065,987 | B2 | 6/2015 | Scalisi |
| 9,094,584 | B2 | 7/2015 | Scalisi et al. |
| 9,113,051 | B1 | 8/2015 | Scalisi |
| 9,113,052 | B1 | 8/2015 | Scalisi et al. |
| 9,118,819 | B1 | 8/2015 | Scalisi et al. |
| 9,142,214 | B2 | 9/2015 | Scalisi |
| 9,160,987 | B1 | 10/2015 | Kasmir et al. |
| 9,165,444 | B2 | 10/2015 | Scalisi |
| 9,172,920 | B1 | 10/2015 | Kasmir et al. |
| 9,172,921 | B1 | 10/2015 | Scalisi et al. |
| 9,172,922 | B1 | 10/2015 | Kasmir et al. |
| 9,179,107 | B1 | 11/2015 | Scalisi |
| 9,179,108 | B1 | 11/2015 | Scalisi |
| 9,179,109 | B1 | 11/2015 | Kasmir et al. |
| 9,196,133 | B2 | 11/2015 | Scalisi et al. |
| 9,197,867 | B1 | 11/2015 | Scalisi et al. |
| 9,230,424 | B1 | 1/2016 | Scalisi et al. |
| 9,237,318 | B2 | 1/2016 | Kasmir et al. |
| 9,247,219 | B2 | 1/2016 | Kasmir et al. |
| 9,253,455 | B1 | 2/2016 | Harrison et al. |
| 9,342,936 | B2 | 5/2016 | Scalisi |
| 9,508,239 | B1 | 11/2016 | Harrison et al. |
| 9,736,284 | B2 | 8/2017 | Scalisi et al. |
| 9,743,049 | B2 | 8/2017 | Scalisi et al. |
| 9,769,435 | B2 | 9/2017 | Scalisi et al. |
| 9,786,133 | B2 | 10/2017 | Harrison et al. |
| 9,799,183 | B2 | 10/2017 | Harrison et al. |
| 2002/0094111 | A1 | 7/2002 | Puchek et al. |
| 2002/0147982 | A1 | 10/2002 | Naidoo et al. |
| 2003/0043047 | A1 | 3/2003 | Braun |
| 2004/0085205 | A1 | 5/2004 | Yeh |
| 2004/0085450 | A1 | 5/2004 | Stuart |
| 2004/0086093 | A1 | 5/2004 | Schranz |
| 2004/0095254 | A1 | 5/2004 | Maruszczak |
| 2004/0135686 | A1 | 7/2004 | Parker |
| 2005/0111660 | A1 | 5/2005 | Hosoda |
| 2006/0010199 | A1 | 1/2006 | Brailean et al. |
| 2006/0022816 | A1 | 2/2006 | Yukawa |
| 2006/0139449 | A1 | 6/2006 | Cheng et al. |
| 2006/0156361 | A1 | 7/2006 | Wang et al. |
| 2007/0008081 | A1 | 1/2007 | Tylicki et al. |
| 2007/0103542 | A1* | 5/2007 | Carter .................. H04N 7/142 348/14.06 |
| 2010/0225455 | A1 | 9/2010 | Claiborne et al. |
| 2013/0057695 | A1 | 3/2013 | Huisking |
| 2014/0267716 | A1* | 9/2014 | Child .................... H04N 7/186 348/143 |
| 2015/0163463 | A1 | 6/2015 | Hwang et al. |
| 2017/0289450 | A1* | 10/2017 | Lemberger ....... G08B 13/19671 |
| 2018/0198973 | A1* | 7/2018 | Eronen ................ H04N 5/2258 |

FOREIGN PATENT DOCUMENTS

| | | |
|---|---|---|
| EP | 0944883 A1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003-283696 A | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |

\* cited by examiner

DIRECTIONAL CONTROL OF AUDIO/VIDEO RECORDING AND COMMUNICATION DEVICES IN NETWORK COMMUNICATION WITH ADDITIONAL CAMERAS

CROSS-REFERENCE TO RELATED APPLICATIONS

This application claims priority to provisional application Ser. No. 62/516,430, filed on Jun. 7, 2017 and provisional application Ser. No. 62/522,418, filed on Jun. 20, 2017. The entire contents of the priority applications are hereby incorporated by reference as if fully set forth.

TECHNICAL FIELD

The present embodiments relate to audio/video (AN) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present audio/video (A/V) recording and communication devices in network communication with at least one second camera have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that A/V recording and communication devices could be enhanced by being in network communication with at least one second camera through a backend server (and/or through direct connection, such as using a "short-link" radio technology (e.g., Bluetooth, Bluetooth low energy, ANT, ANT+ ZigBee, etc.)). For example, the second camera and the A/V recording and communication device having a first camera may be in different geographic locations, with the second camera providing and enabling functionalities that might not be possible if the first and second cameras were part of a single device. In some embodiments, the second camera could have different performance characteristics from the first camera, such as different resolution and/or different power consumption. In one example, the second camera may be a low-power, low-resolution camera that may be powered on at all times, while the first camera of the A/V recording and communication device may be a high-power, high-resolution camera that is maintained in a low-power state. In some embodiments, the first camera may be configured such that it may be pointed to capture image data in various directions about a 360-degrees rotational axis (or less).

For example, the A/V recording and communication device may be placed on a premises with the one or more second cameras placed at different locations on the premises and configured to detect motion and capture image data of an object and/or person. Upon detecting motion, the one or more second cameras may direct the first camera of the A/V recording and communication device to point in a particular direction and capture image data of the object and/or person of interest. In some embodiments, the one or more second cameras may also direct the first camera of the A/V recording and communication device to power up. This configuration, in which the one or more second cameras are initially powered on and the first camera is powered down, advantageously conserves power, which is of particular advantage in embodiments in which the A/V recording and communication device is powered by a rechargeable battery (e.g., is not connected to a source of external power, such as AC mains). Moreover, the use of the one or more second cameras to point the first camera of the A/V recording and communication device further advantageously conserves power by reserving the use of the higher resolution and/or power consuming camera for capturing image data in select directions and at select times, as further described below. In addition, the image data captured by the one or more second cameras and the image data captured by the first camera of the A/V recording and communication device may be used by a backend server to more precisely locate and identify objects and/or persons of interest. Further, the image data captured by the first camera of the A/V recording and communication device may be superimposed onto the image data captured by the second camera(s). For example, the image data captured by the second camera(s) may be used for background portions of a scene and the image data captured by the first camera of the A/V recording and communication device may be used for portions of the scene that include motion. Moreover, in some embodiments, the image data captured by the first camera of the A/V recording and communication device may be a higher resolution than the image data captured by the second camera(s), thereby making the active motion portions of the scene a higher quality than the static background portions of the scene. These and other aspects and advantages of the present embodiments are described in further detail below.

In a first aspect, a method for a backend server comprising a communication module and a processing module operatively connected to the communication module, wherein the processing module is in network communication with an A/V recording and communication device having a first camera configured to capture first image data at a first resolution, wherein the first camera is pointed in a first direction, and in network communication with a second camera configured to capture second image data at a second resolution, the method comprising: receiving an output signal from the second camera using the communication module, wherein the output signal includes the second image data captured using the second camera; generating an orientation signal based on the output signal from the second camera; transmitting the orientation signal to the A/V recording and communication device, wherein the orientation signal includes a command to point the first camera of the A/V recording and communication device in a second direction; receiving the first image data captured by the first camera of the A/V recording and communication device, wherein the first camera is pointed in the second direction; and superimposing the first image data captured using the first camera pointed in the second direction onto the second image data captured using the second camera.

In an embodiment of the first aspect, the method further comprises generating a power-up command signal based on the output signal from the second camera.

In another embodiment of the first aspect, the method further comprises transmitting the power-up command signal to the A/V recording and communication device, wherein the power-up command signal configures the first camera of the A/V recording and communication device to power up from a low-power state and capture the first image data at the first resolution.

In another embodiment of the first aspect, the orientation signal includes a specific rotational degree relative to a fixed direction to point the first camera in the second direction.

In another embodiment of the first aspect, the orientation signal includes a specific rotational degree relative to a position of the second camera to point the first camera in the second direction.

In another embodiment of the first aspect, the second image data captured using the second camera comprises a plurality of low-resolution frames.

In another embodiment of the first aspect, the method further comprises generating background footage using the plurality of low-resolution frames.

In another embodiment of the first aspect, the first image data captured using the first camera pointed in the second direction comprises a plurality of high-resolution frames.

In another embodiment of the first aspect, the method further comprises determining at least one active motion block within the plurality of high-resolution frames.

In another embodiment of the first aspect, the method further comprises determining the at least one active motion block by comparing pixel values of a first one of the high-resolution frames with corresponding pixel values of a second one of the high-resolution frames.

In another embodiment of the first aspect, the method further comprises superimposing the first image data captured using the first camera pointed in the second direction onto the second image data captured using the second camera by superimposing the at least one active motion block onto the background footage.

In a second aspect, a backend server for audio/video (A/V) recording and communication devices, the server comprising: a communication module; and a processing module operatively connected to the communication module, wherein the processing module is in network communication with an A/V recording and communication device having a first camera configured to capture first image data at a first resolution, wherein the first camera is pointed in a first direction, and in network communication with a second camera configured to capture second image data at a second resolution, the processing module comprising: a processor; and a server application, wherein the server application configures the processor to: receive an output signal from the second camera using the communication module, wherein the output signal includes the second image data captured using the second camera; generate an orientation signal based on the output signal from the second camera; transmit the orientation signal to the A/V recording and communication device, wherein the orientation signal includes a command to point the first camera of the A/V recording and communication device in a second direction; receive the first image data captured by the first camera of the A/V recording and communication device, wherein the first camera is pointed in the second direction; and superimpose the first image data captured using the first camera pointed in the second direction onto the second image data captured using the second camera.

In an embodiment of the second aspect, the server application further configures the processor to generate a power-up command signal based on the output signal from the second camera.

In another embodiment of the second aspect, the server application further configures the processor to transmit the power-up command signal to the A/V recording and communication device, wherein the power-up command signal configures the first camera of the A/V recording and communication device to power up from a low-power state and capture the first image data at the first resolution.

In another embodiment of the second aspect, the orientation signal includes a specific rotational degree relative to a fixed direction to point the first camera in the second direction.

In another embodiment of the second aspect, the orientation signal includes a specific rotational degree relative to a position of the second camera to point the first camera in the second direction.

In another embodiment of the second aspect, the second image data captured using the second camera comprises a plurality of low-resolution frames.

In another embodiment of the second aspect, the server application further configures the processor to generate background footage using the low-resolution frames.

In another embodiment of the second aspect, the first image data captured using the first camera pointed in the second direction comprises a plurality of high-resolution frames.

In another embodiment of the second aspect, the server application further configures the processor to determine at least one active motion block within the plurality of high-resolution frames.

In another embodiment of the second aspect, the server application further configures the processor to determine the at least one active motion block by comparing pixel values of a first one of the high-resolution frames with corresponding pixel values of a second one of the high-resolution frames.

In another embodiment of the second aspect, the server application further configures the processor to superimpose the first image data captured using the first camera pointed in the second direction onto the second image data captured using the second camera by superimposing the at least one active motion block onto the background footage.

In a third aspect, an audio/video (A/V) recording and communication device is provided, the A/V recording and communication device comprising: a first camera configured to capture first image data at a first resolution, wherein the first camera is pointed in a first direction; a communication module; and a processing module operatively connected to the first camera and the communication module, wherein the processing module is in network communication with a backend server via the communication module, the processing module comprising: a processor; and a camera application, wherein the camera application configures the processor to: maintain the first camera in a low-power state; receive a power-up command signal from the backend server based on an output signal from a second camera in network communication with the backend server; receive an orientation signal from the backend server based on the output signal from the second camera in network communication with the backend server; point the first camera in a second direction in response to the orientation signal from the backend server based on the output signal from the second camera; power up the first camera in response to the power-up command signal from the backend server based on the output signal from the second camera; and capture the first image data using the first camera in response to the power-up command signal from the backend server based on the output signal from the second camera.

In an embodiment of the third aspect, the orientation signal and the power-up command signal are included in a single command signal.

In another embodiment of the third aspect, the orientation signal includes a specific rotational degree relative to a fixed direction to point the first camera in the second direction.

In another embodiment of the third aspect, the fixed direction is true north.

In another embodiment of the third aspect, the orientation signal includes a specific rotational degree relative to a position of the second camera to point the first camera in the second direction.

In another embodiment of the third aspect, the A/V recording and communication device further comprises a motorized mount configured to point the first camera in the second direction in response to the orientation signal.

In another embodiment of the third aspect, the motorized mount is configured to rotate the A/V recording and communication device to point the first camera in any direction about a 360-degree rotational axis.

In another embodiment of the third aspect, the camera application further configures the processor to capture the first image data using the first camera for a predetermined length of time in response to the power-up command signal from the backend server based on the output signal from the second camera.

In another embodiment of the third aspect, the second camera is configured to capture second image data at a second resolution.

In another embodiment of the third aspect, the first resolution is higher than the second resolution.

In another embodiment of the third aspect, the camera application further configures the processor to transmit the first image data captured using the first camera to the backend server using the communication module.

In a fourth aspect, a method for an audio/video (A/V) recording and communication device comprising a first camera configured to capture first image data at a first resolution, wherein the first camera is pointed in a first direction, a communication module, and a processing module operatively connected to the first camera and the communication module, wherein the processing module is in network communication with a second camera via the communication module, the method comprising: maintaining the first camera in a low-power state; receiving a power-up command signal from the second camera; receiving an orientation signal from the second camera; pointing the first camera in a second direction in response to the orientation signal from the second camera; powering up the first camera in response to the power-up command signal from the second camera; and capturing the first image data using the first camera in response to the power-up command signal from the second camera.

In an embodiment of the fourth aspect, the orientation signal and the power-up command signal are included in a single command signal.

In another embodiment of the fourth aspect, the orientation signal includes a specific rotational degree relative to a fixed direction to point the first camera in the second direction.

In another embodiment of the fourth aspect, the fixed direction is true north.

In another embodiment of the fourth aspect, the orientation signal includes a specific rotational degree relative to a position of the second camera to point the first camera in the second direction.

In another embodiment of the fourth aspect, the first camera is pointed in the second direction in response to the orientation signal using a motorized mount.

In another embodiment of the fourth aspect, the motorized mount rotates the A/V recording and communication device to point the first camera in any direction about a 360-degree rotational axis.

In another embodiment of the fourth aspect, the method further comprises capturing the first image data using the first camera for a predetermined length of time in response to the power-up command signal from the backend server based on the output signal from the second camera.

In another embodiment of the fourth aspect, the second camera is configured to capture second image data at a second resolution.

In another embodiment of the fourth aspect, the first resolution is higher than the second resolution.

In another embodiment of the fourth aspect, the method further comprises transmitting the first image data captured using the first camera to a backend server using the communication module.

BRIEF DESCRIPTION OF THE DRAWINGS

The various embodiments of the present audio/video (A/V) recording and communication devices with multiple cameras now will be discussed in detail with an emphasis on highlighting the advantageous features. These embodiments depict the novel and non-obvious A/V recording and communication devices with multiple cameras shown in the accompanying drawings, which are for illustrative purposes only. These drawings include the following figures, in which like numerals indicate like parts.

DETAILED DESCRIPTION

Figure 1:
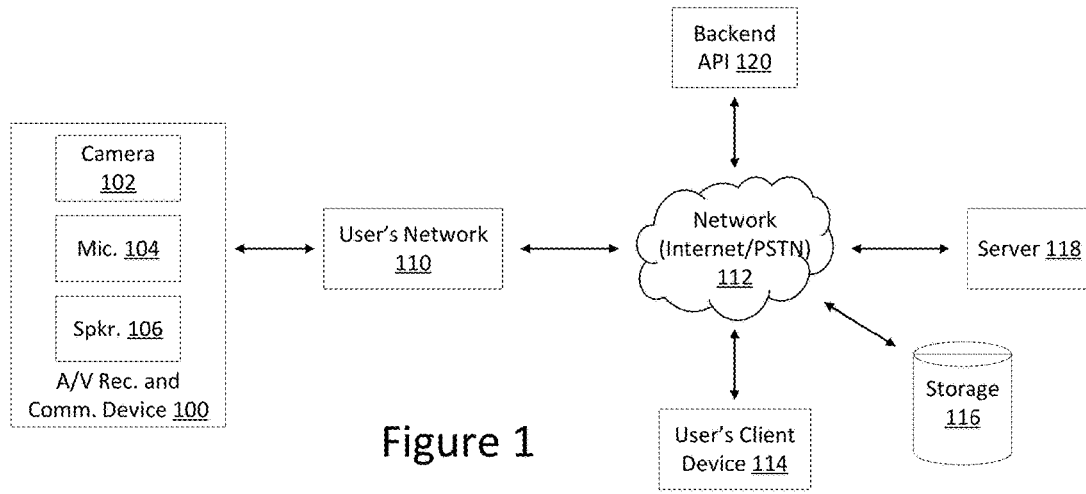
FIG. 1 is a functional block diagram illustrating a system for streaming and storing A/V content captured by an audio/video (A/V) recording and communication device according to various aspects of the present disclosure.

The following detailed description describes the present embodiments with reference to the drawings. In the drawings, reference numbers label elements of the present embodiments. These reference numbers are reproduced below in connection with the discussion of the corresponding drawing features.

The embodiments of the present audio/video (A/V) recording and communication devices in network communication with at least one second camera are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
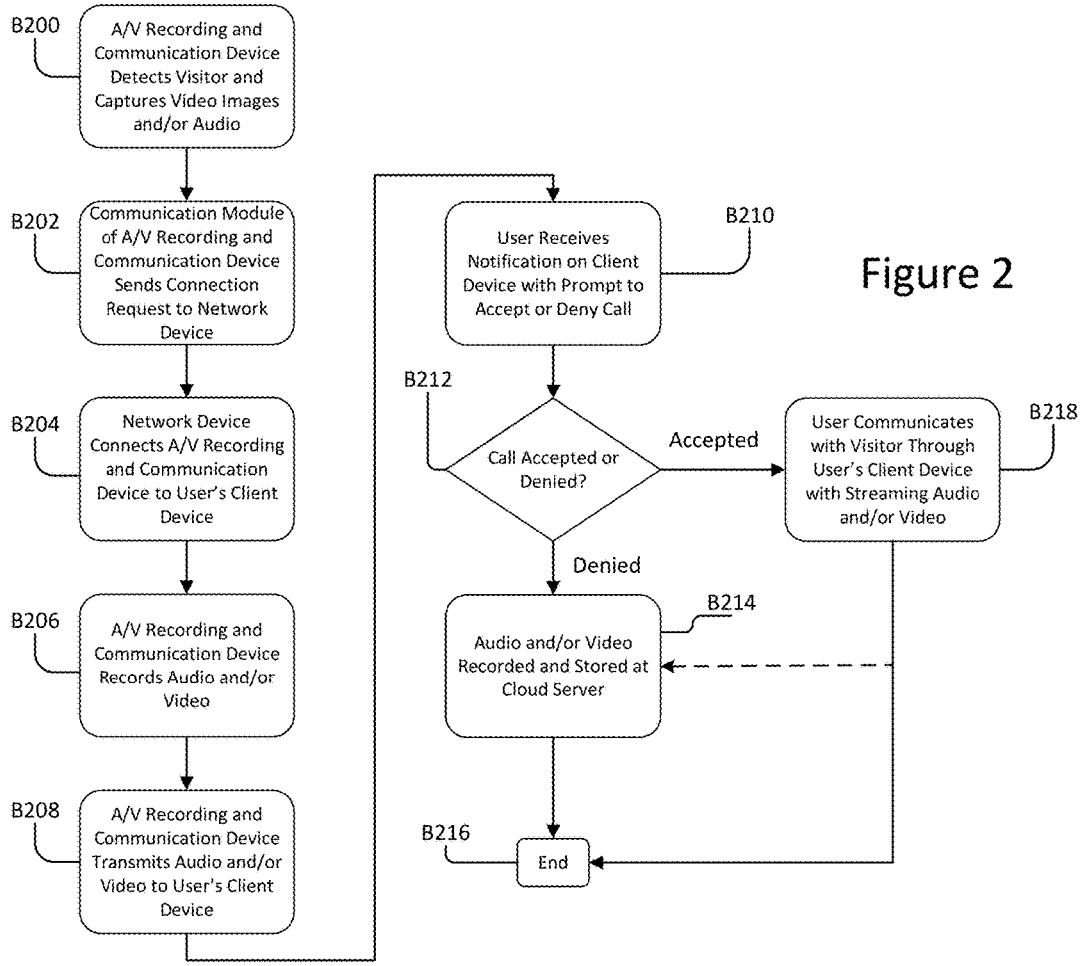
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
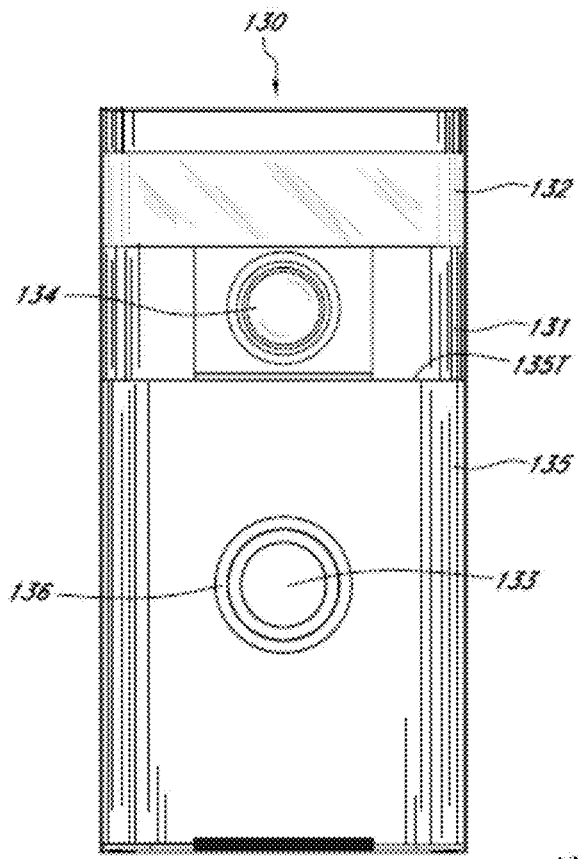
FIG. 3 is a front view of an A/V recording and communication device according to various aspects of the present disclosure.
Figure 4:
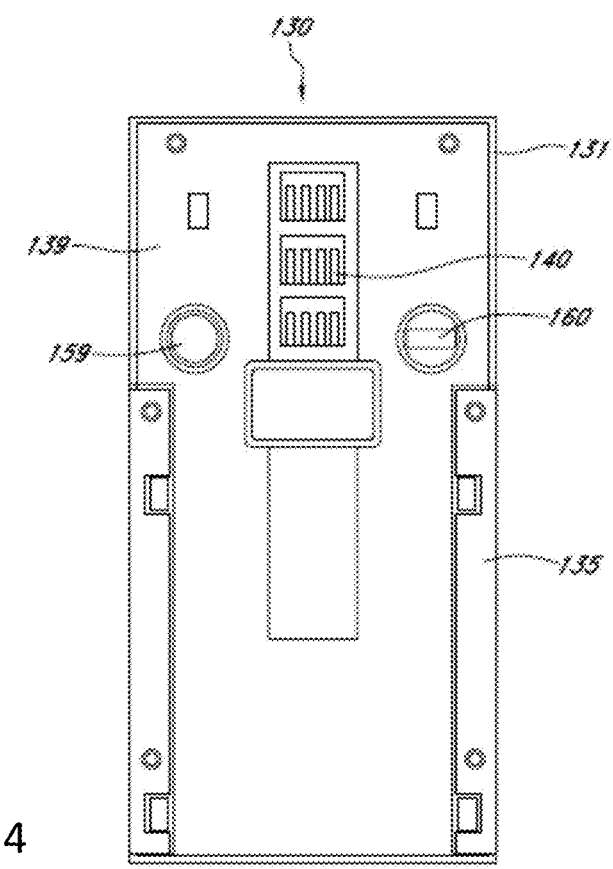
FIG. 4 is a rear view of the A/V recording and communication device of FIG. 3.
Figure 5:
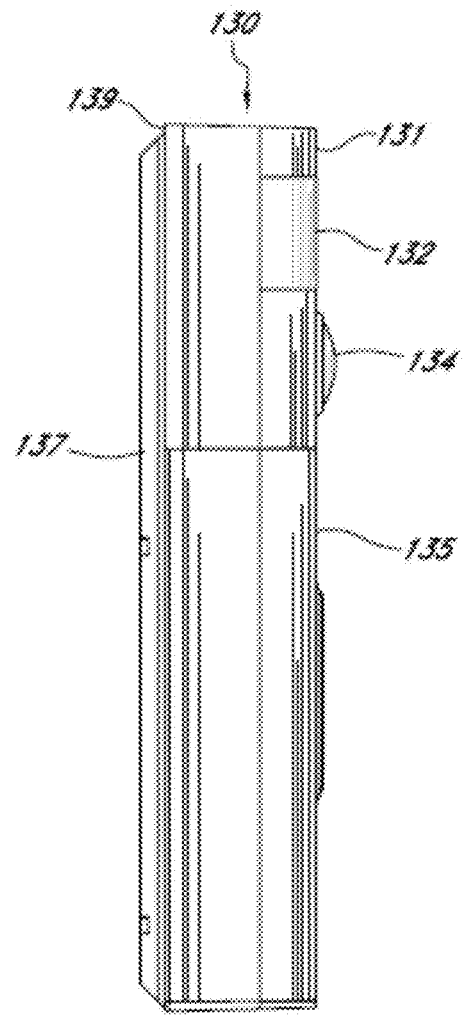
FIG. 5 is a left side view of the A/V recording and communication device of FIG. 3 attached to a mounting bracket according to various aspects of the present disclosure.

FIGS. 3-5 illustrate a wireless audio/video (A/V) communication doorbell 130 according to an aspect of present embodiments. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
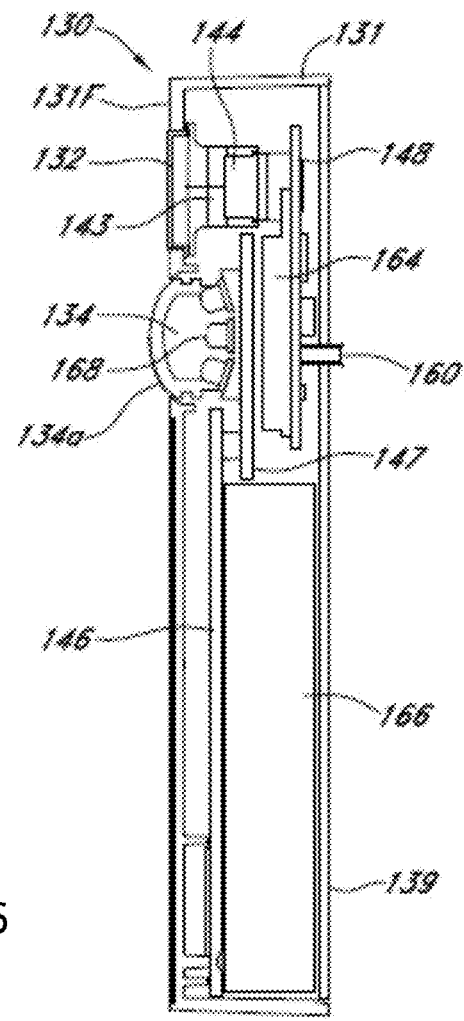
FIG. 6 is cross-sectional right side view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. In some embodiments, the doorbell 130 may comprise three PIR sensors 144, as further described below, but in other embodiments any number of PIR sensors 144 may be provided. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
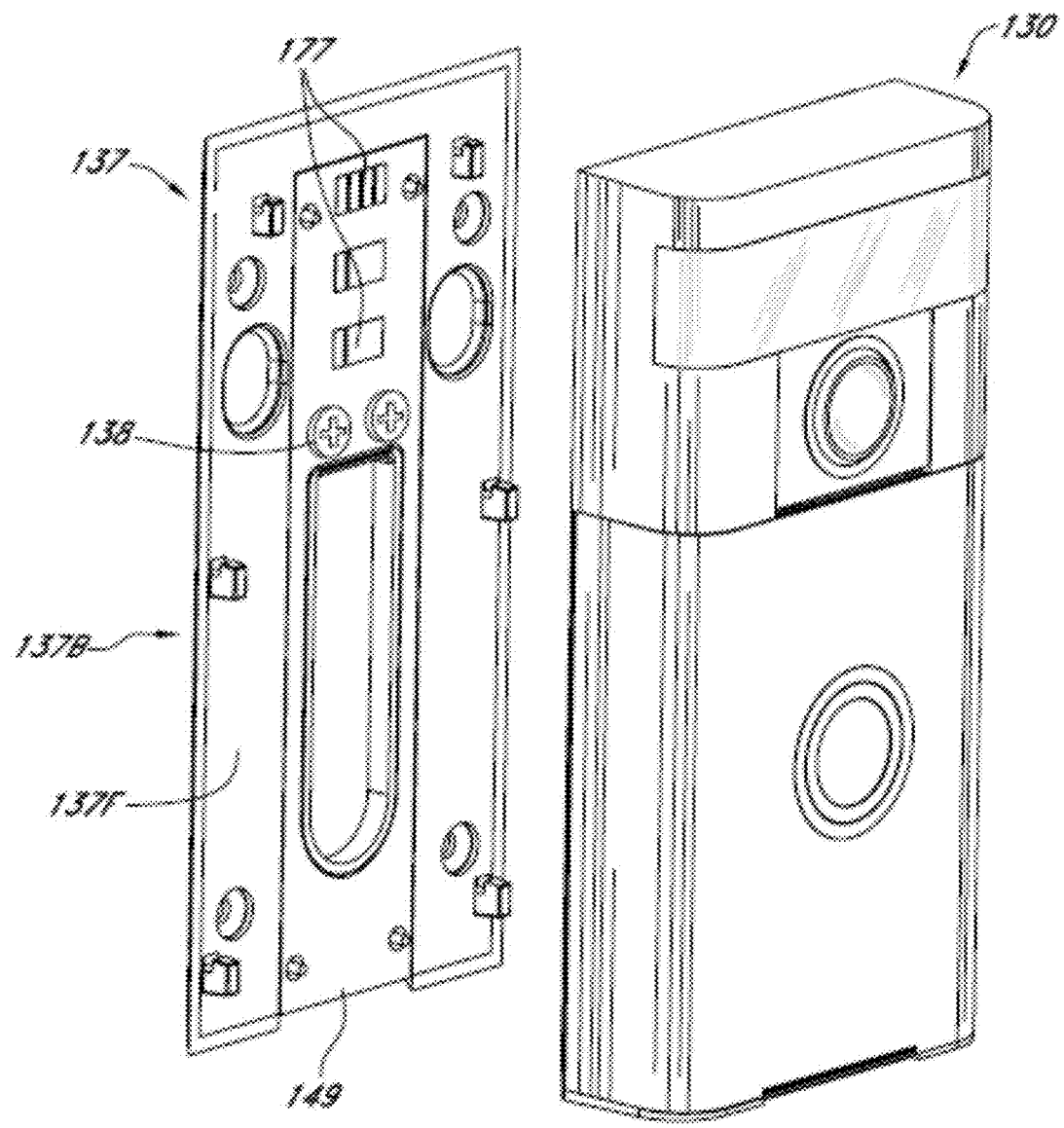
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
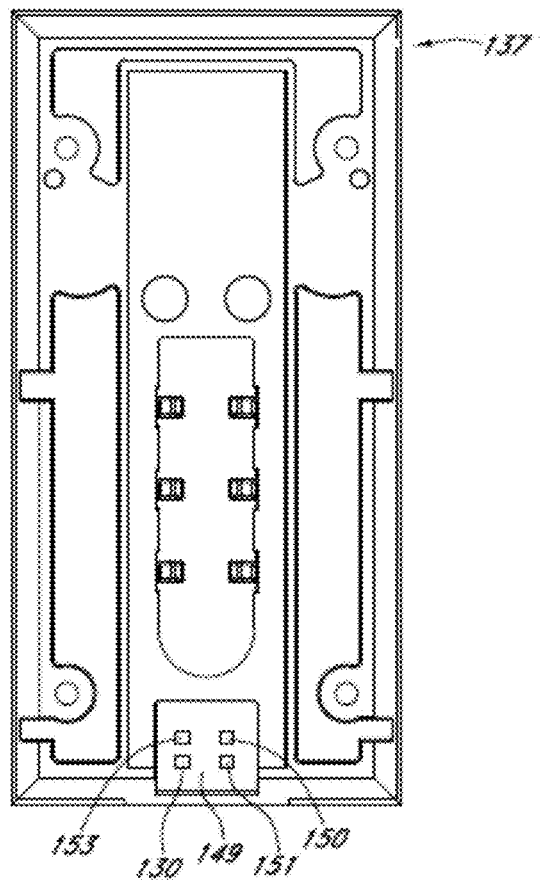
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
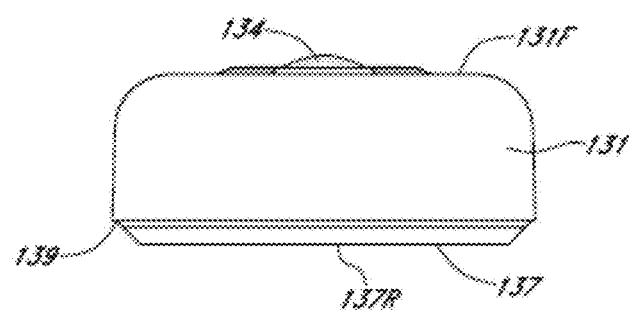
FIGS. 9 and 10 are top and bottom views, respectively, of the A/V recording and communication device and the mounting bracket of FIG. 5.
Figure 10:
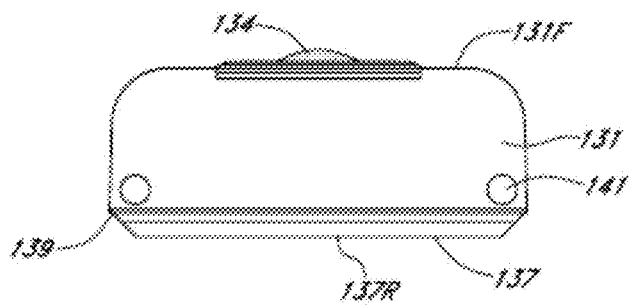

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
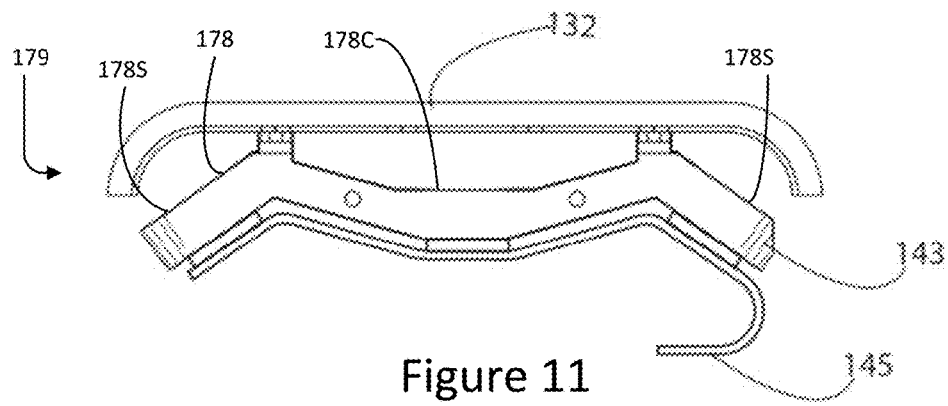
FIG. 11 is a top view of a passive infrared sensor assembly according to various aspects of the present disclosure.
Figure 12:
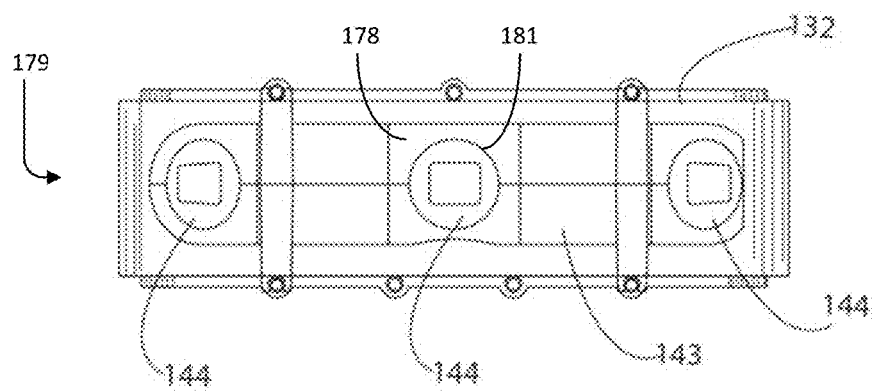
FIG. 12 is a front view of the passive infrared sensor assembly of FIG. 11.

FIG. 11 is a top view and FIG. 12 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 12, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 11, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 13:
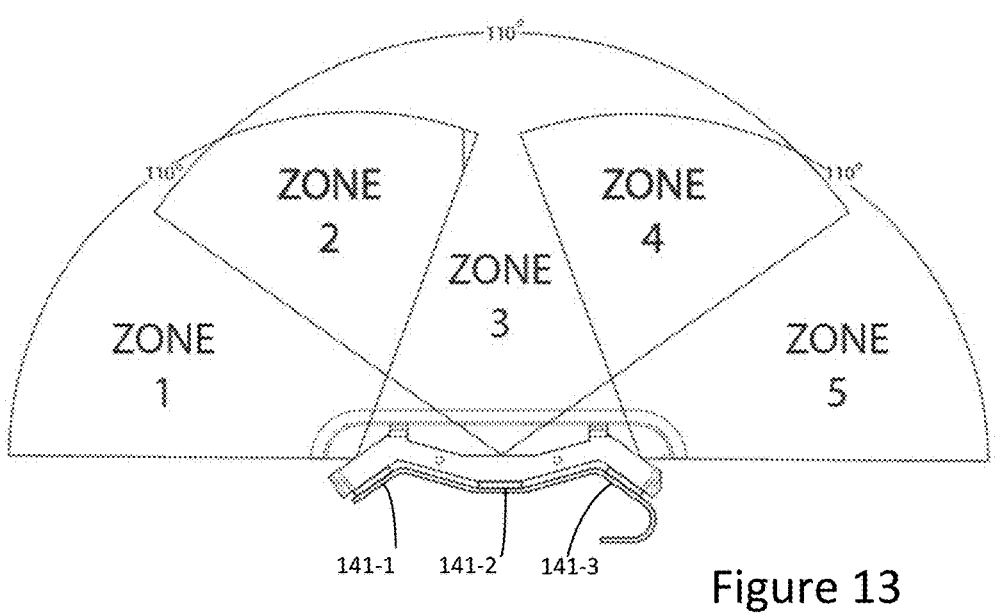
FIG. 13 is a top view of the passive infrared sensor assembly of FIG. 11, illustrating the fields of view of the passive infrared sensors according to various aspects of the present disclosure.

FIG. 13 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 14:
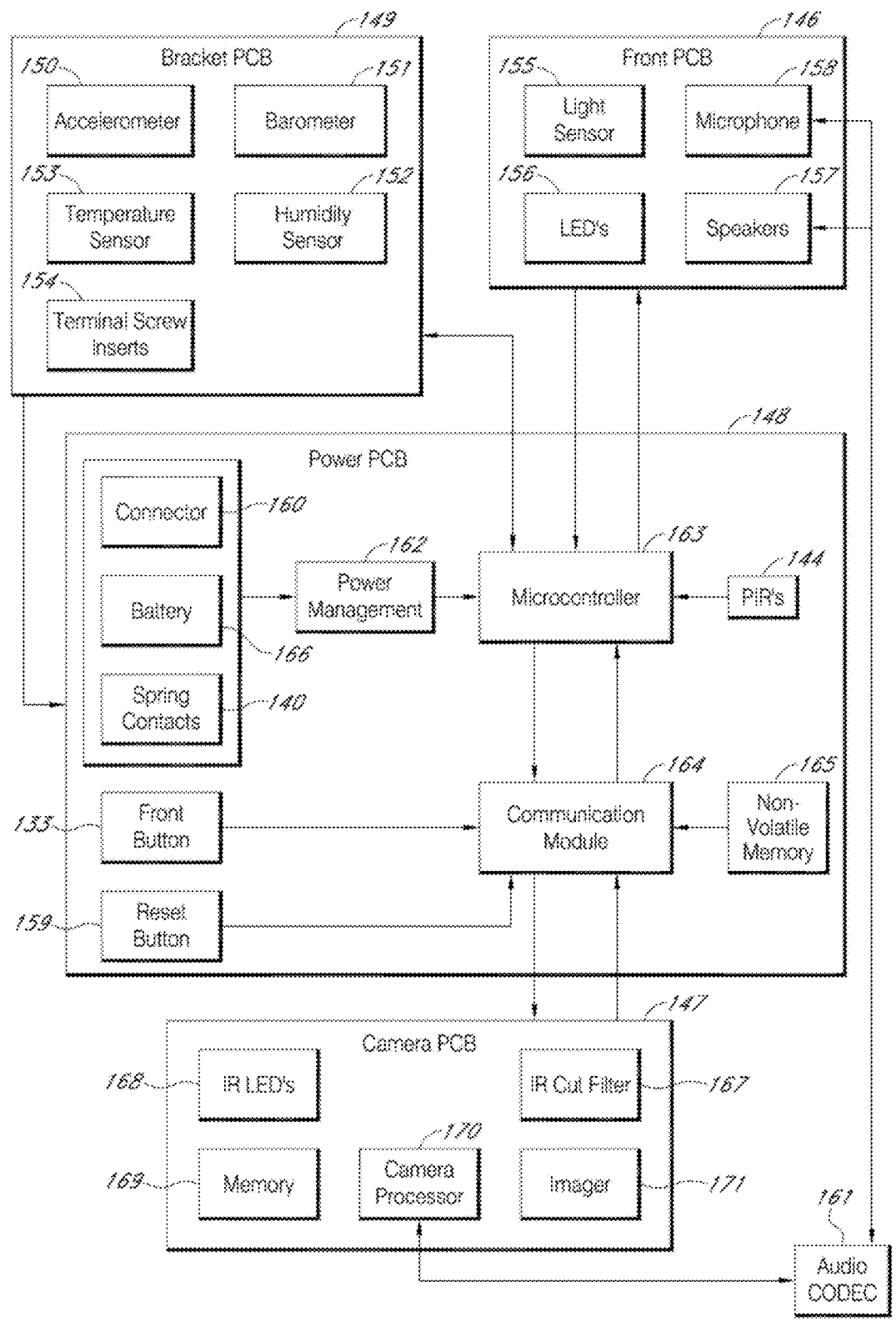
FIG. 14 a functional block diagram of the components of the A/V recording and communication device of FIG. 3.

FIG. 14 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 14, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 14, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 14, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 14, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 14, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 14, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 1080p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, the present embodiments leverage the capabilities of audio/video (A/V) recording and communication devices, thereby providing enhanced functionality to such devices to reduce crime and increase public safety. One aspect of the present embodiments includes the realization that A/V recording and communication devices could be enhanced by being in network communication with at least one second camera through a backend server (and/or through direct connection, such as using a "short-link" radio technology (e.g., Bluetooth, Bluetooth low energy, ANT, ANT+, ZigBee, etc.)). For example, the second camera and the A/V recording and communication device having a first camera may be in different geographic locations, with the second camera providing and enabling functionalities that might not be possible if the first and second cameras were part of a single device. In some embodiments, the second camera could have different performance characteristics from the first camera, such as different resolution and/or different power consumption. In one example, the second camera may be a low-power, low-resolution camera that may be powered on at all times, while the first camera of the A/V recording and communication device may be a high-power, high-resolution camera that is maintained in a low-power state. In some embodiments, the first camera may be configured such that it may be pointed to capture image data in various directions about a 360-degrees rotational axis (or less).

For example, the A/V recording and communication device may be placed on a premises with the one or more second cameras placed at different locations on the premises and configured to detect motion and capture image data of an object and/or person. Upon detecting motion, the one or more second cameras may direct the first camera of the A/V recording and communication device to point in a particular direction and capture image data of the object and/or person of interest. In some embodiments, the one or more second cameras may also direct the first camera of the A/V recording and communication device to power up. This configuration, in which the one or more second cameras are initially powered on and the first camera is powered down, advantageously conserves power, which is of particular advantage in embodiments in which the A/V recording and communication device is powered by a rechargeable battery (e.g., is not connected to a source of external power, such as AC mains). Moreover, the use of the one or more second cameras to point the first camera of the A/V recording and communication device further advantageously conserves power by reserving the use of the higher resolution and/or power consuming camera for capturing image data in select directions and at select times, as further described below. In addition, the image data captured by the one or more second cameras and the image data captured by the first camera of the A/V recording and communication device may be used by the backend server to more precisely locate and identify objects and/or persons of interest. Further, the image data captured by the first camera of the A/V recording and communication device may be superimposed onto the image data captured by the second camera(s). For example, the image data captured by the second camera(s) may be used for background portions of a scene and the image data captured by the first camera of the A/V recording and communication device may be used for portions of the scene that include motion. Moreover, in some embodiments, the image data captured by the first camera of the A/V recording and communication device may be a higher resolution than the image data captured by the second camera(s), thereby making the active motion portions of the scene a higher quality than the static background portions of the scene. These and other aspects and advantages of the present embodiments are described in further detail below.

Figure 15:
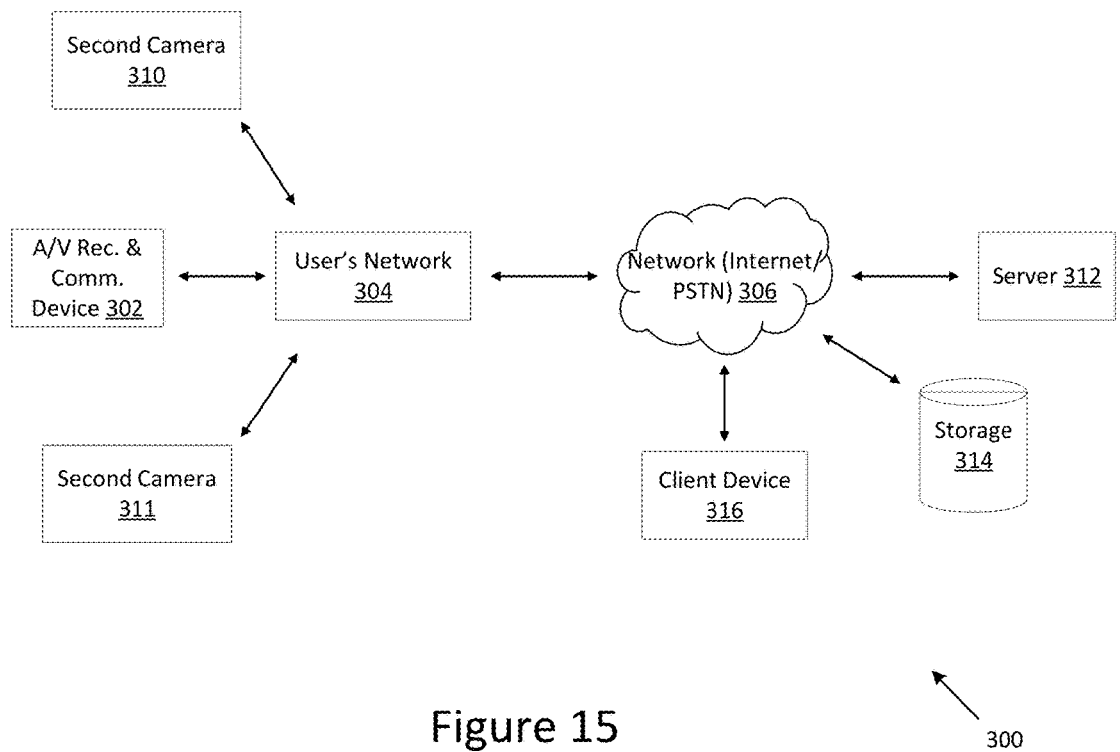
FIG. 15 is a functional block diagram illustrating a system for using at least one second camera to position an A/V recording and communication device according to various aspects of the present disclosure.

FIG. 15 is a functional block diagram illustrating a system for using at least one second camera to position an audio/video (A/V) recording and communication device according to various aspects of the present disclosure. The system 300 may include an A/V recording and communication device 302 having a first camera and configured to access a user's network 304 to connect to a network (Internet/PSTN) 306. In various embodiments, the system 300 may also include one or more second cameras 310, 311 in network communication with the A/V recording and communication device 302. Although two second cameras 310, 311 are illustrated in FIG. 15, one second camera or three or more second cameras may be used as appropriate to the particular system. In some embodiments, the second cameras 310, 311 may be configured to access the user's network 304 to connect to the network (Internet/PSTN) 306. In such embodiments, the second cameras 310, 311 may be located on the same premises (or nearby) to access and use the user's network 304. For example, the A/V recording and communication device 302 may be placed near an entrance of a premises and the second cameras 310, 311 placed surrounding the premises. In addition, the second cameras 310, 311 may be configured to connect to the network (Internet/PSTN) 306 using a cellular network, a public network, a low-bandwidth network, and/or any other appropriate network to access the network (Internet/PSTN) 306. In such embodiments, the second cameras 310, 311 may be placed farther from the user's network 304, thus allowing for wider coverage. In various embodiments, the second cameras 310, 311 may be used to detect events and to position the first camera of the A/V recording and communication device 302 using processes as further described below. In some embodiments, the A/V recording and communication device 302 may include a motorized mount that allows for the first camera to be positioned (also referred to as pointed or aimed) in a particular direction. In several embodiments, the second cameras 310, 311 may also be used in powering up the first camera of the A/V recording and communication device 302 using processes as further described below. In alternative embodiments, the second camera may connect to the A/V recording and communication device 302 directly, such as using a "short-link" radio technology (e.g., Bluetooth, Bluetooth low energy, ANT, ANT+, ZigBee, etc.).

With reference to FIG. 15, the system 300 may also include a user's client device 316 configured to be in network communication with the A/V recording and communication device 302. The system 300 may also include a storage device 314 and a backend server 312 in network communication with the A/V recording and communication device 302 and the second cameras 310, 311. In some embodiments, the storage device 314 may be a separate device from the backend server 312 (as illustrated) or may be an integral component of the backend sever. The user's network 304 and the network 306 may be similar in structure and/or function to the user's network 110 and the network 112 (FIG. 1), respectively. In some embodiments, the A/V recording and communication device 302 may be similar in structure and/or function to the A/V recording and communication device 100 (FIG. 1) and/or the A/V recording and communication doorbell 130 (FIGS. 3-13). In some embodiments, the user's client device 316 and the storage device 314 may be similar in structure and/or function to the user's client device 114 and the storage device 116 (FIG. 1), respectively. Also in some embodiments, the backend server 312 may be similar in structure and/or function to the server 118 and/or the backend API 120 (FIG. 1).

Figure 16:
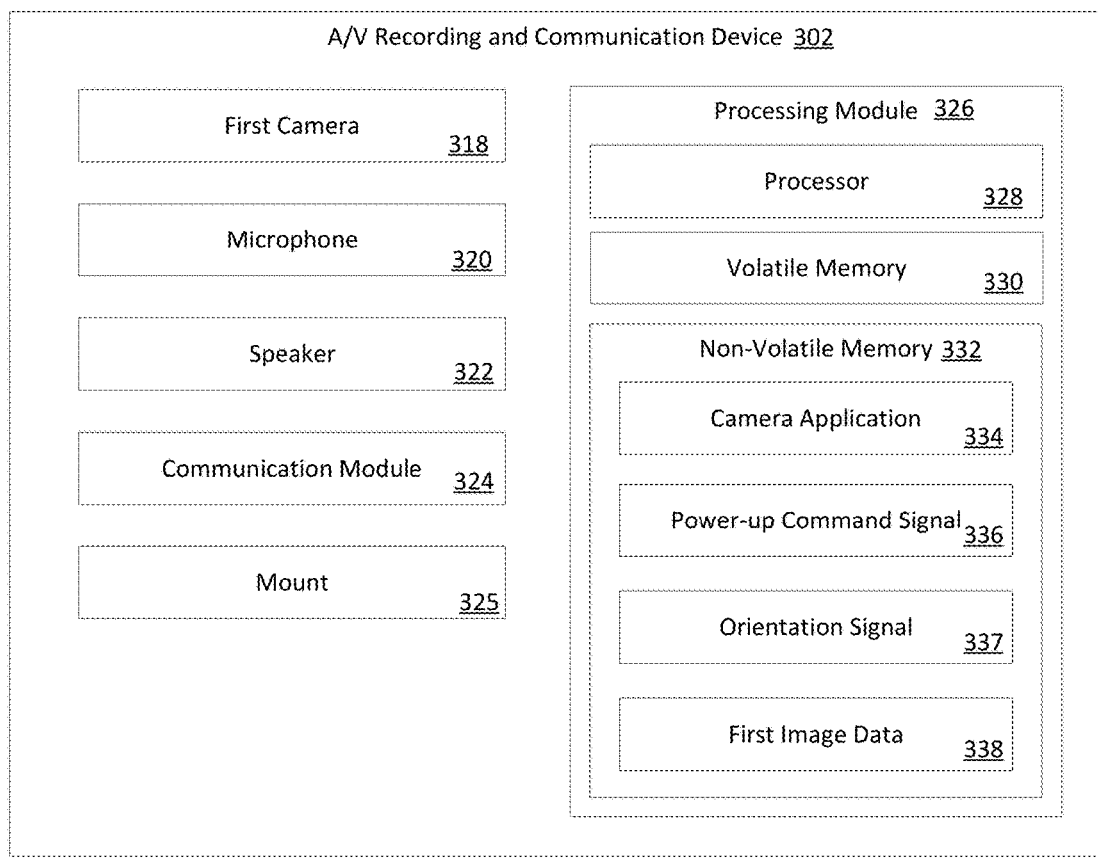
FIG. 16 is a functional block diagram illustrating one embodiment of an A/V recording and communication device according to various aspects of the present disclosure.

FIG. 16 is a functional block diagram illustrating an embodiment of the A/V recording and communication device 302 according to various aspects of the present disclosure. The A/V recording and communication device 302 may comprise a processing module 326 that is operatively connected to a first camera 318, a microphone 320, a speaker 322, and a communication module 324. In some embodiments, the processing module 326 may also be operatively connected to a motorized mount 325 that allows the first camera 318 to rotate about an axis such as (but not limited) 180-degrees, 270-degrees, or 360-degrees, thereby enabling the first camera 318 to be pointed in any desired direction within the range of rotational motion. In some embodiments, the motorized mount 325 may rotate the entire A/V recording and communication device 302 and thereby point the first camera 318 in a desired direction, as further described below. In alternative embodiments, the first camera 318 may be configured to point in a desired direction by rotating within a socket of the A/V recording and communication device 302. In further embodiments, the first camera 318 may include a wide-view feature that allows the first camera 318 to capture image data in a particular direction without having to physically be rotated or positioned.

In further reference to FIG. 16, the processing module 326 may comprise a processor 328, volatile memory 330, and non-volatile memory 322 that includes a camera application 334. The camera application 334 may configure the processor 328 to perform one or more processes for positioning and powering up the first camera 318 in response to an orientation signal 337 and/or a power-up command signal 336, respectively, received from the backend server 312, as further described below. In some embodiments, the camera application 334 may configure the motorized mount 325 to point the first camera 318 in a particular direction in response to the orientation signal from the backend server 312. The camera application 334 may also configure the processor 328 to capture first image data 338 using the first camera 318 upon powering up, as further described below. In some embodiments, the first camera 318 may capture the first image data 338 at a first resolution, as further described below. In various embodiments, the first image data 338, the orientation signal 337, and the power-up command signal 336 may be saved in the non-volatile memory 332. Further, a communication module, such as the communication module 324, may comprise (but is not limited to) one or more transceivers and/or wireless antennas (not shown) configured to transmit and receive wireless signals. In further embodiments, the communication module 324 may comprise (but is not limited to) one or more transceivers configured to transmit and receive wired and/or wireless signals.

Figure 17:
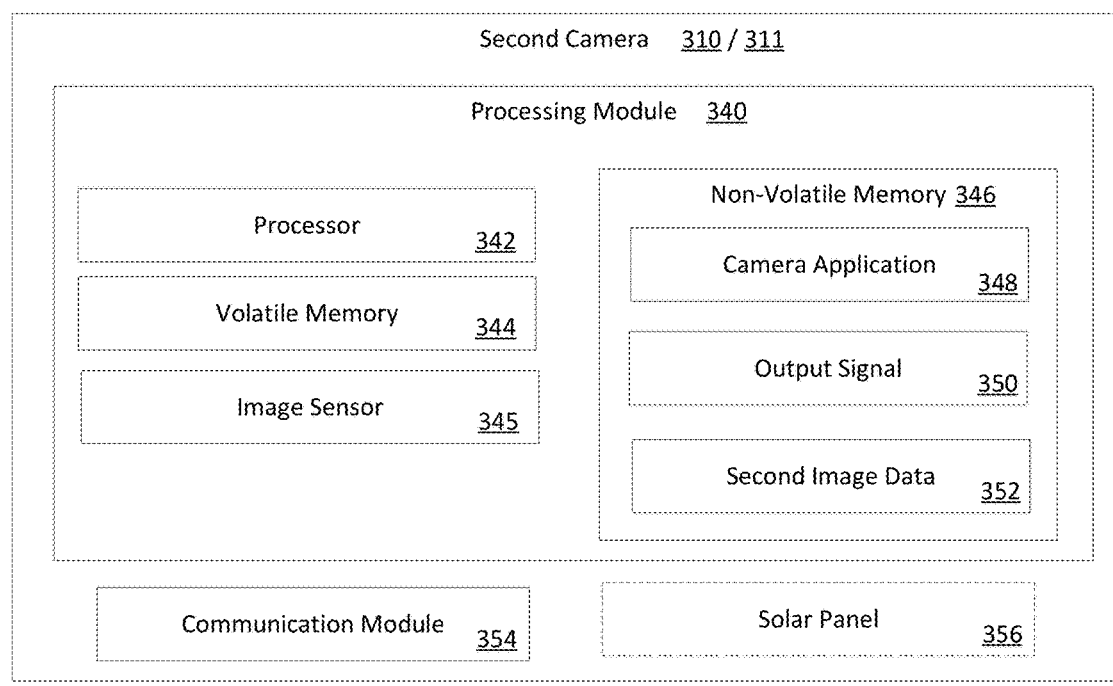
FIG. 17 is a functional block diagram illustrating one embodiment of a second camera device according to various aspects of the present disclosure.

FIG. 17 is a functional block diagram illustrating an embodiment of the second camera device 310, 311 according to various aspects of the present disclosure. In some embodiments, the second camera 310, 311 may be a stand-alone unit (as illustrated) or an integral part of another device, such as another A/V recording and communication device, such as an A/V recording and communication doorbell. Further, the second camera 310, 311 may have its own processing capabilities (as illustrated) or may be controlled and configured by a separate processing module (not illustrated). The second camera 310, 311 may include a communication module 354 for network communication with the A/V recording and communication device 302 and/or the backend server 312. In some embodiments, the second camera 310, 311 may include a processing module 340 comprising an image sensor 345, a processor 342, volatile memory 344, and non-volatile memory 346. The non-volatile memory 346 may comprise a camera application 348 that configures the processor 342 to perform a variety of camera functions including capturing second image data 352 using the image sensor 345 and generating an output signal 350. In various embodiments, the output signal 350 be transmitted to the backend server 312 using the communication module 354, where the backend server 312 may generate the orientation signal 337 and power-up command signal 336 based on the output signal 350, as further described below. In some embodiments, the captured second image data 352 and/or the output signal 350 may be stored in the non-volatile memory 346. In various embodiments, the second camera 310 may be configured to capture the second image data 352 at a second resolution. The second camera 310 may also include at least one solar panel 356 as a power source. Similarly, the A/V recording and communication device 302 may also include at least one solar panel (not shown) as a power source.

In reference to FIGS. 16 and 17, the first resolution of the first camera 318 and the second resolution of the second camera 310 may be different. In some embodiments, the first resolution may be higher than the second resolution, or vice versa. The different resolutions of the first and second cameras 318, 310 may result in the lower resolution camera also consuming less power than the higher resolution camera. In alternative embodiments, one of the cameras 318, 310 may consume less power than the other camera 310, 318, even if the difference in power consumption is unrelated to the resolution(s) of the two cameras 310, 318. For example, in some embodiments the two cameras 318, 310 may have similar (or the same) resolution, but one of the cameras 318, 310 may consume less power than the other camera 310, 318.

With further reference to FIGS. 16 and 17, the first and second image data 338, 352 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments.

Figure 18:
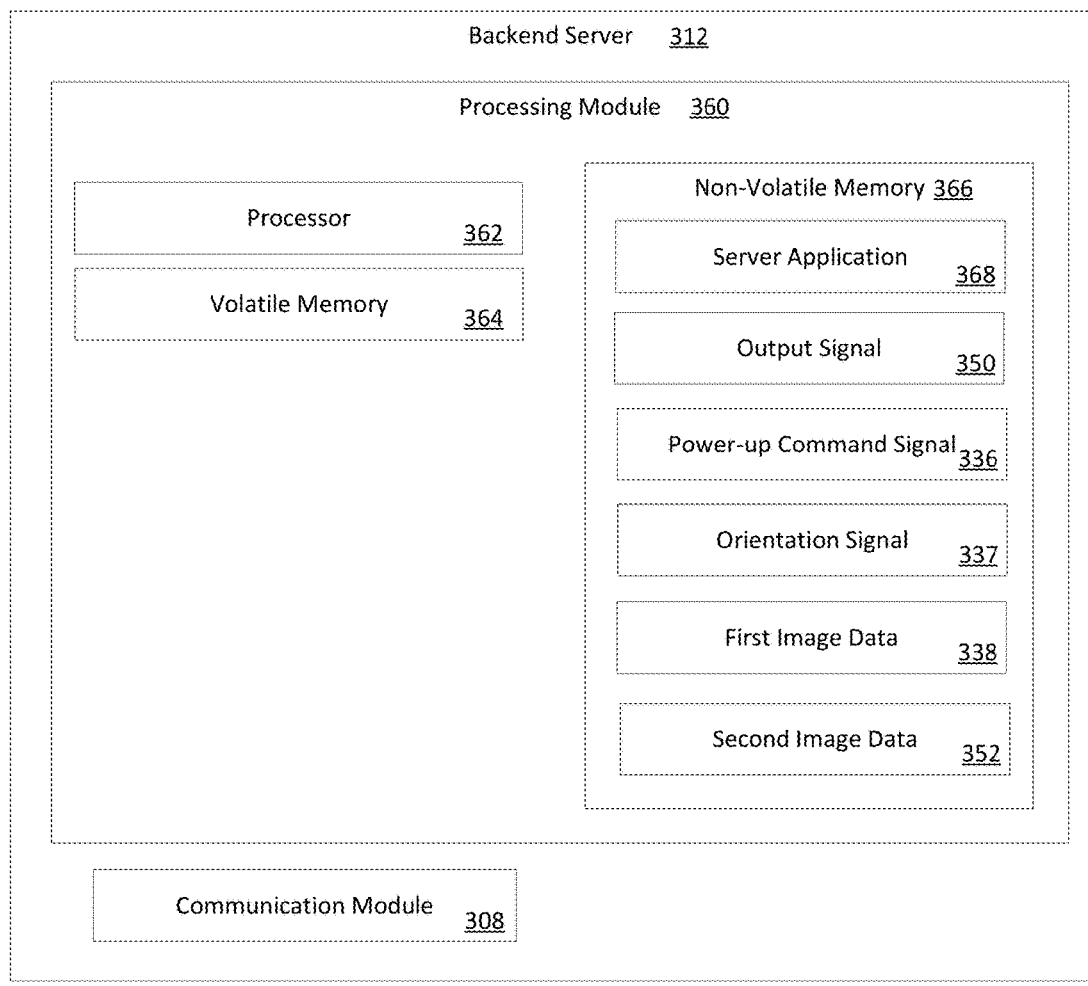
FIG. 18 is a functional block diagram illustrating one embodiment of a backend server according to various aspects of the present disclosure.

FIG. 18 is a functional block diagram illustrating one embodiment of the backend server 312 according to various aspects of the present disclosure. The backend server 312 may comprise a processing module 360 comprising a processor 362, volatile memory 364, a communication module 308, and non-volatile memory 366. The communication module 308 may allow the backend server 312 to access and communicate with devices connected to the network (Internet/PSTN) 306. The non-volatile memory 366 may include a server application 368 that configures the processor 362 to perform processes for using the one or more second cameras 310, 311 to enhance the functionalities and performance of the A/V recording and communication device 302, as further described below. The non-volatile memory 366 may include the output signal 350 received from the second camera 310 and, in some embodiments, the second image data 352 captured using the one or more second cameras 310, 311. Upon receiving the output signal 350, the backend server 312 may generate an orientation signal 337 for pointing the first camera 318 of the A/V recording and communication device 302, as further described below. Further, upon receiving the output signal 350, the backend server 312 may generate a power-up command signal 336 for powering up the A/V recording and communication device 302, as further described below. In some embodiments, the orientation signal 337 and the power-up command signal 350 may be a single command signal. In various embodiments, the non-volatile memory 366 may also include the first image data 338 and the second image data 352 captured by the first camera 318 and the second camera(s) 310, 311, respectively. As further described below, the backend server 312 may be configured to determine more precise locations (relative to location determinations made by a single camera device) of persons and/or objects of interest by using triangulation (or trilateration, or triangulateration, or any other method of determining the location of a point by reference to one or more known points) based on relative positions of corresponding points of interest found in the first and second image data 338, 352, as further described below.

In the illustrated embodiment of FIGS. 16-18, the various components including (but not limited to) the processing modules 326, 340, 360 and the communication modules 324, 354, 308 are represented by separate boxes. The graphical representations depicted in each of FIGS. 16-18 are, however, merely examples, and are not intended to indicate that any of the various components of the A/V recording and communication device 302, the second camera 310, or the backend server 312 are necessarily physically separate from one another, although in some embodiments they might be. In other embodiments, however, the structure and/or functionality of any or all of the components of the A/V recording and communication device 302 may be combined. For example, in some embodiments the communication module 324 may include its own processor, volatile memory, and/or non-volatile memory. Likewise, the structure and/or functionality of any or all of the components of the one or more second cameras 310, 311 may be combined. For example, in some embodiments the communication module 354 may include its own processor, volatile memory, and/or non-volatile memory. Further, the structure and/or functionality of any or all of the components of the backend server 312, may be combined. For example, in some embodiments the communication module 308 may include its own processor, volatile memory, and/or non-volatile memory.

Figure 19:
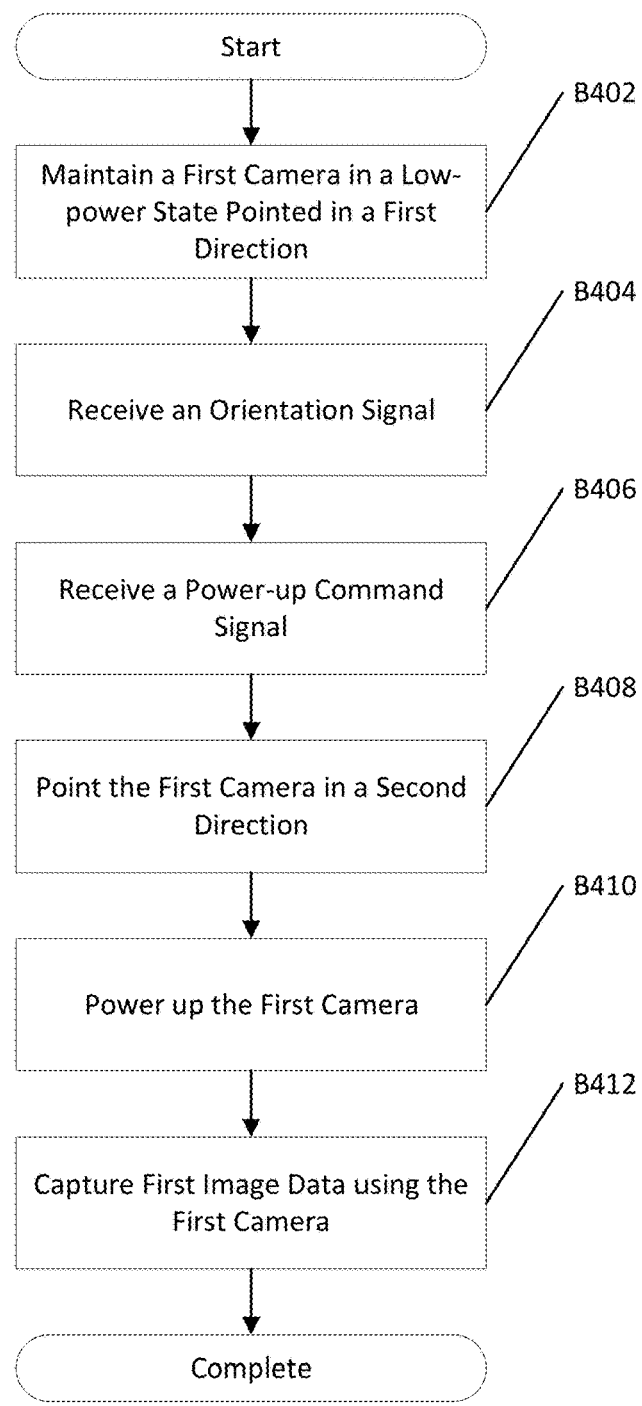
FIGS. 19 and 20 are flowcharts illustrating embodiments of processes for positioning and powering up a first camera of an A/V recording and communication device using a second camera according to various aspects of the present disclosure.

FIG. 19 is a flowchart illustrating one embodiment of a process 400 for positioning and powering up the first camera 318 of the A/V recording and communication device 302 using the one or more second cameras 310, 311 according to various aspects of the present disclosure. In some embodiments, the A/V recording and communication device 302 may be placed about a premises or location in combination with (e.g., surrounded by) the one or more second cameras 310, 311 where the one or more second cameras 310, 311 may be used to position the first camera 318 of the A/V recording and communication device 302 in a particular direction. For example, the first camera 318 may be initially pointed in a first direction and then be configured to point in a second direction in response to the orientation signal 337, as further described below. In various embodiments, the one or more second cameras 310, 311 may capture the second image data 352 at a lower resolution and/or consume less power than the first camera 318. Further, the second camera 310 may remain in a persistent powered-up state and be configured to capture image data at all times. In contrast, the first camera 318 may capture image data at a higher resolution and/or consume more power than the second camera 310. In addition, the first camera 318 may be configured to remain in a powered-down state most of the time (may also be referred to as a hibernation state, or a low-power state, or an off state, or the like). This configuration, in which the one or more second cameras 310, 311 are always powered on and the first camera 318 is usually powered down, advantageously conserves power, which is of particular advantage in embodiments in which the A/V recording and communication device 302 is powered by a rechargeable battery (e.g., is not connected to a source of external power, such as AC mains). Moreover, the use of the one or more second cameras 310, 311 to point the first camera 318 of the A/V recording and communication device 302 further advantageously conserves power by reserving the use of the higher resolution and/or higher power consuming camera for capturing image data in select directions and at select times, as further described below. In addition, the image data captured by the one or more second cameras 310, 311 and the first camera 318 may be used by the backend server 312 to more precisely locate and identify objects and/or persons found within both the first and second image data 352, as further described below.

With reference to FIG. 19, the process 400 may include maintaining (block B402) the first camera 318 pointed in a first direction in a low-power state to conserve and reduce the amount of power used by the A/V recording and communication device 302. The process 400 may also include receiving (block B404) an orientation signal 337, using the communication module 324, from the backend server 312 based on an output signal 350 from the one or more second cameras 310, 311, as further described below. The process 400 may further include receiving (block B406) a power-up command signal 336, using the communication module 324, from the backend server 312 based on an output signal 350 from the second camera 310, as further described below. In some embodiments, the orientation signal 337 and the power-up command signal 336 may be included in a single command signal. In some embodiments, receiving (blocks B404 and B406) the orientation signal 337 and/or the power-up command signal 336 (or the single command signal), using the communication module 324, may comprise receiving the orientation signal 337 and/or the power-up command signal 336 directly from the one or more second cameras 310, 311 based on the output signal 350 from the one or more second cameras 310, 311. In response to the orientation signal 337, the first camera 318 may be pointed in a second direction (block B408). In some embodiments, the relative locations of the first camera 318 and the one or more second cameras 310, 311 may be known by the backend server 312, the A/V recording and communication device 302, and/or the one or more second cameras 310, 311 using various location discovery methods well-known in the art and/or provided by a user. In some embodiments, the orientation signal 337 may include a specific rotational degree to a fixed direction to point the first camera 318 in the second direction. In various embodiments, the fixed direction may be true north and/or any other direction that may be known to define a relative rotational degree in relationship to the known direction. In some embodiments, the orientation signal 337 may include a specific rotational degree relative to a position of the one or more second cameras 310, 311 to point the first camera 318 in the second direction. In some embodiments, a motorized mount 325 may be used to point the first camera 318 in the second direction in response to the orientation signal 337. The motorized mount 325 may be configured to rotate the A/V recording and communication device 302 to point the first camera 318 in any direction about a rotational axis. In some embodiments, the motorized mount 325 may be configured to rotate 180-degrees, or 270-degrees, or 360-degrees, or any other angle, about the rotational axis.

In further reference to FIG. 19, in response to the power-up command signal 336, the first camera 318 may be powered up (block B410) and the A/V recording and communication device 302 may be configured to capture (block B412) first image data 338 using the first camera 318 pointed in the second direction. In some embodiments, the first camera 318 may revert back to the low-power state after capturing the first image data 338 for a predetermined length of time, or after motion within the field of view of the first camera 318 ceases. In some embodiments, the A/V recording and communication device 302 may be configured to transmit the first image data 338 captured using the first camera 318 to the backend server 312 using the communication module 324. In some further embodiments, the A/V recording and communication device 302 may be configured to transmit the first image data 338 captured using the first camera 318 to the client device 316 using the communication module 324. As described above, the first camera 318 may be configured to capture first image data 338 at a first resolution and the one or more second cameras 310, 311 may be configured to capture second image data 352 at a second resolution. In various embodiments, the first resolution may be higher than the second resolution, and vice versa. In some embodiments, the first resolution and the second resolution may be equal.

Figure 20:
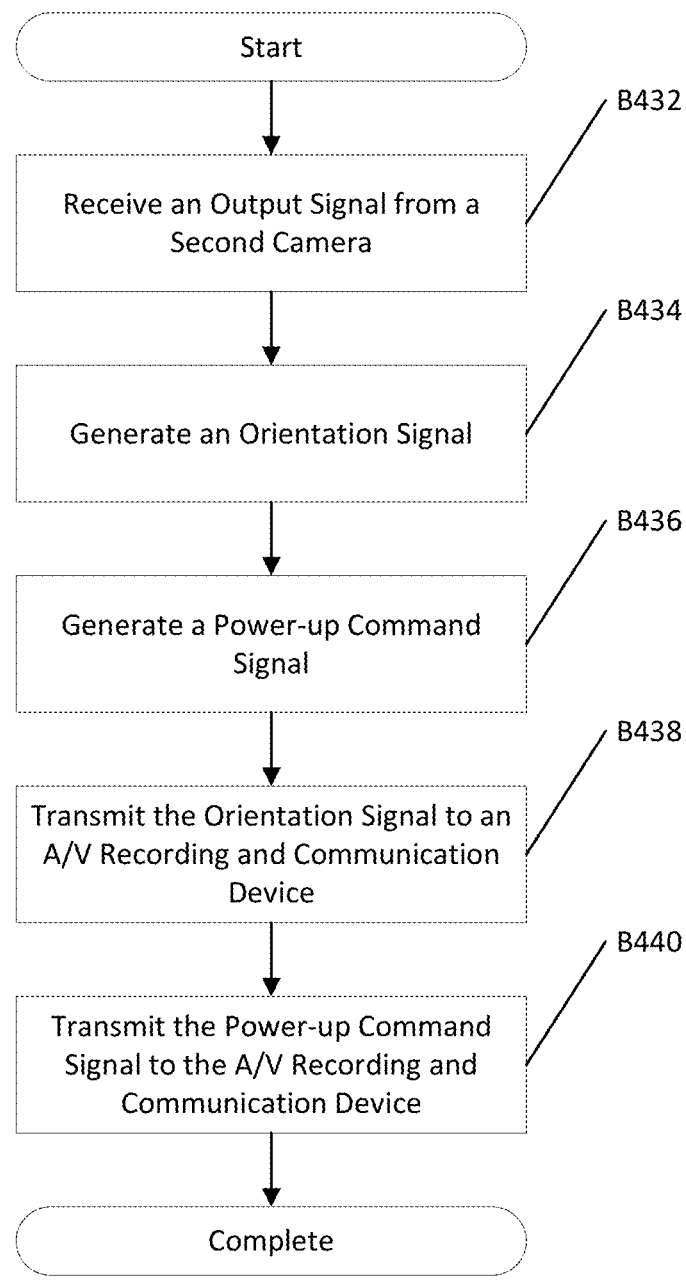

FIG. 20 is a flowchart illustrating another embodiment of a process 430 for positioning and powering up the first camera 318 of the A/V recording and communication device 302 using the one or more second cameras 310, 311 according to various aspects of the present disclosure. As described above, the one or more second cameras 310, 311 may be configured to capture second image data 352 and transmit an output signal 350 to the backend server 312 using the communication module 354. The output signal 350 may be used by the backend server 312 to generate an orientation signal 337 and a power-up command signal 336, as further described below.

In reference to FIG. 20, the process 430 may include receiving (block B432) the output signal 350 by the backend server 312 from the one or more second cameras 310, 311 using the communication module 308. Upon receiving the output signal 350, the process 430 may also include generating (block B434) the orientation signal 337 based on the output signal 350, where the orientation signal 337 configures the first camera 318 of the A/V recording and communication device 302 to point from a first direction to a second direction. In various embodiments, the second direction points the first camera 318 toward an object and/or a person of interest. For example, the one or more second cameras 310, 311 may detect an object and/or a person of interest using the second image data 352. Based on the relative location of the object and/or the person of interest in relationship to the first direction that the first camera 318 is pointing, the second direction may be determined. As described above, the orientation signal 337 may include a specific rotational degree relative to a fixed direction to point the first camera 318 in the second direction. In some embodiments, the fixed direction may be true north. Further, the orientation signal 337 may include a specific rotational degree relative to a position of the one or more second cameras 310, 311 to point the first camera 318 in the second direction. Further, the relative locations of the one or more second cameras 310, 311 to the first camera 318 of the A/V recording and communication device 302 may be determined by the one or more second cameras 310, 311 and included with the output signal 350. In other embodiments, the relative locations of the one or more second cameras 310, 311 to the first camera 318 may be determined by the backend server 312 after receiving the output signal 350, as described above.

In further reference to FIG. 20, the process 430 may also include generating (block B436) a power-up command signal 336 based on the output signal 350 received from the one or more second cameras 310, 311. The process 430 may further include transmitting (blocks B438 and B440) the orientation signal 337 and the power-up command signal 336 to the A/V recording and communication device 302 in network communication with the server 312, wherein the orientation signal 337 configures the first camera 318 to point in the second direction, and the power-up command signal 336 configures the first camera 318 to power up from a low-power state and capture first image data 338, as described above.

Figure 21:
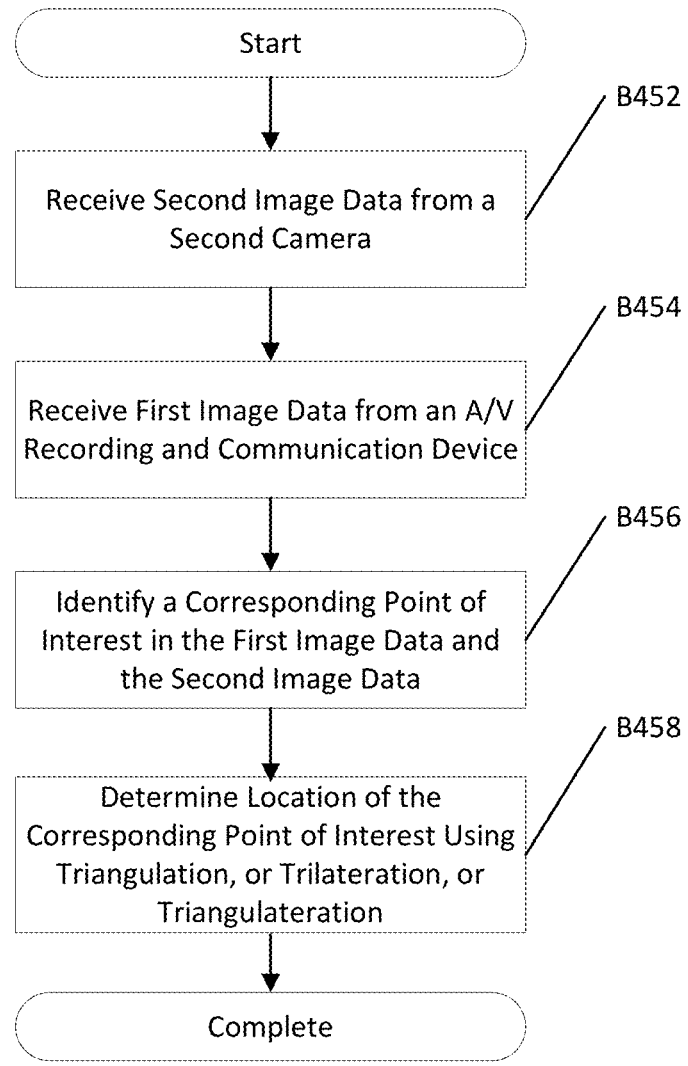
FIG. 21 is a flowchart illustrating an embodiment of a process for determining a location of a corresponding point of interest using triangulation (or trilateration, or triangulateration, or any other method of determining the location of a point by reference to one or more known points) according to various aspects of the present disclosure.

The backend server 312 may be configured to receive first image data 338 captured using the first camera 318 of the A/V recording and communication device 302 in addition to the second image data 352 captured by the one or more second cameras 310, 311. FIG. 21 is a process 450 for determining a location of a corresponding point of interest found in the first and second image data 338, 352 using triangulation (or trilateration, or triangulateration, or any other method of determining the location of a point by reference to one or more known points) according to various aspects of the prevent disclosure. The process 450 may include receiving (blocks B452 and B454) second image data 352 from the one or more second cameras 310, 311, and first image data 338 from the A/V recording and communication device 302, as described above. In various embodiments, the one or more second cameras 310, 311 may have captured second image data 352 in response to motion and/or detection of an object and/or a person moving within a field of view of the one or more second cameras 310, 311. In addition, the first camera 318 may be positioned to point in a second direction, such that the first camera 318 may have a field of view that captures first image data 338 that includes the object and/or the person that was detected in the second image data 352.

In further reference to FIG. 21, the process 450 may also include identifying a corresponding point of interest in the first image data 338 and the second image data 352. In some embodiments, the corresponding point of interest may represent the object and/or the person of interest. The process 450 may further include determining (block B458) a location of the corresponding point of interest using triangulation (or trilateration, or triangulateration, or any other method of determining the location of a point by reference to one or more known points) based on relative positions of the corresponding point of interest in the first image data 338 and the second image data 352 using various processes and methods well-known in the art. For example, in one non-limiting embodiment, triangulation (or trilateration, or triangulateration, etc.) may be performed using computer vision on two-dimensional (2D) image data to determine a location of an object and/or a person of interest in three-dimensional (3D) space. In such embodiments, the corresponding point of interest (or a pair of corresponding points) may be depicted in 3D space as projections on the first image data 338 and second image data 352. Knowing the performance parameters of the first and second cameras, the corresponding point of interest may be determined, since each point in a 2D image corresponds to a line in 3D space, and thus all points on the line are projected to the point in the 2D image. By identifying the corresponding point in the first image data 338 and the second image data 352, the projection of the corresponding point as a common 3D point in space may be determined to more accurately locate the object and/or the person of interest.

Figure 22:
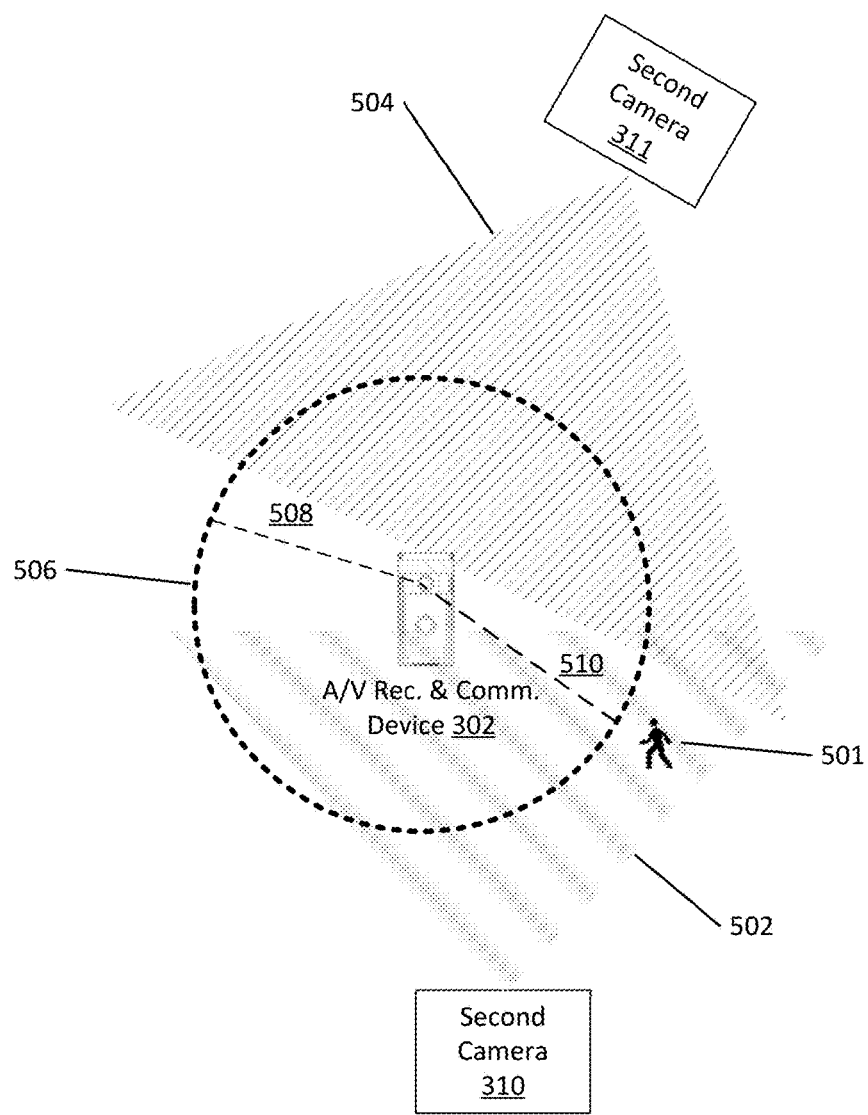
FIG. 22 is a functional block diagram illustrating an embodiment of positioning and powering up a first camera of an A/V recording and communication device using at least one second camera according to various aspects of the present disclosure.

FIG. 22 is a functional block diagram illustrating an embodiment of positioning and powering up the first camera 318 of the A/V recording and communication device 302 using the one or more second cameras 310, 311 according to various aspects of the present disclosure. The diagram 500 illustrates the A/V recording and communication device 302 placed on a premises along with the second cameras 310, 311. The first camera 318 of the A/V recording and communication device 302 may be pointed in a first direction 508 and may be capable of rotating 360-degrees about an axis to point in any direction that intersects an imaginary circle 506 drawn about the A/V recording and communication device 302, as described above. The second camera 310 may have a field of view 502 and the second camera 311 may have a field of view 504. In some embodiments, the fields of view 502, 504 of the one or more second cameras 310, 311 may or may not overlap. In some embodiments, the A/V recording and communication device 302 may or may not be located within the fields of view 502, 504. In reference to FIG. 22, the second camera 310 may detect and capture second image data 352 of the object and/or the person of interest 501. Using the processes described above, the first camera 318 of the A/V recording and communication device 302 may be pointed in a second direction 510 and capture first image data 338 that includes image data of the object and/or the person of interest 501.

Figure 23:
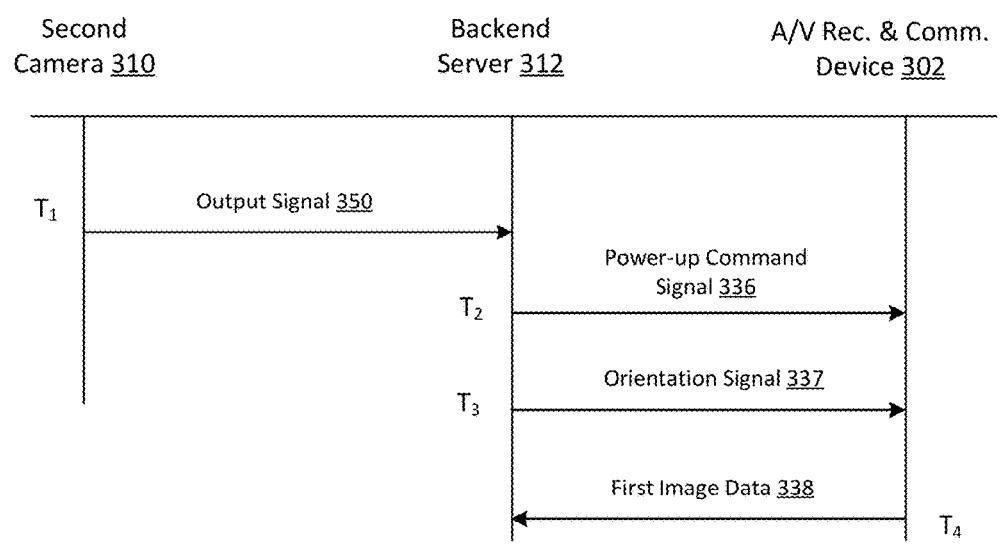
FIG. 23 is a sequence diagram illustrating an embodiment of a process for positioning and powering up a first camera of an A/V recording and communication device in network communication with a second camera according to various aspects of the present disclosure.

FIG. 23 is a sequence diagram illustrating an embodiment of a process for positioning and powering up the first camera 318 of an A/V recording and communication device 302 in network communication with one or more second cameras 310, 311 according to various aspects of the present disclosure. With reference to FIG. 23, the process may include one or more second cameras 310, 311, a backend server 312, and an A/V recording and communication device 302 having a first camera 318. At a time $T_1$, the one or more second cameras 310, 311 may be configured to transmit an output signal 350 to the backend server 312, as described above. In some embodiments, the output signal 350 may include second image data 352 captured by the one or more second cameras 310, 311. In some embodiments, the output signal 350 may also include positions of the one or more second cameras 310, 311 in relationship to the first camera 318, as described above. In response to receiving the output signal 350, the backend server 312 may generate and transmit an orientation signal 337 and a power-up command signal 336 to the A/V recording and communication device 302 at a time $T_2$ and $T_3$, respectively. In some embodiments, the power-up command signal 336 and the orientation signal 337 may be sent in the reverse order from that depicted in FIG. 23, or may be sent simultaneously, or may be combined into a single signal. In various embodiments, the orientation signal 337 may configure the first camera 318 to point from a first direction to a second direction, as described above. Further, the power-up command signal 336 may configure the first camera 318 to power up and capture first image data 338, as described above. At a time $T_4$, the A/V recording and communication device 302 may transmit the first image data 338 to the backend sever 312, as described above.

Figure 24:
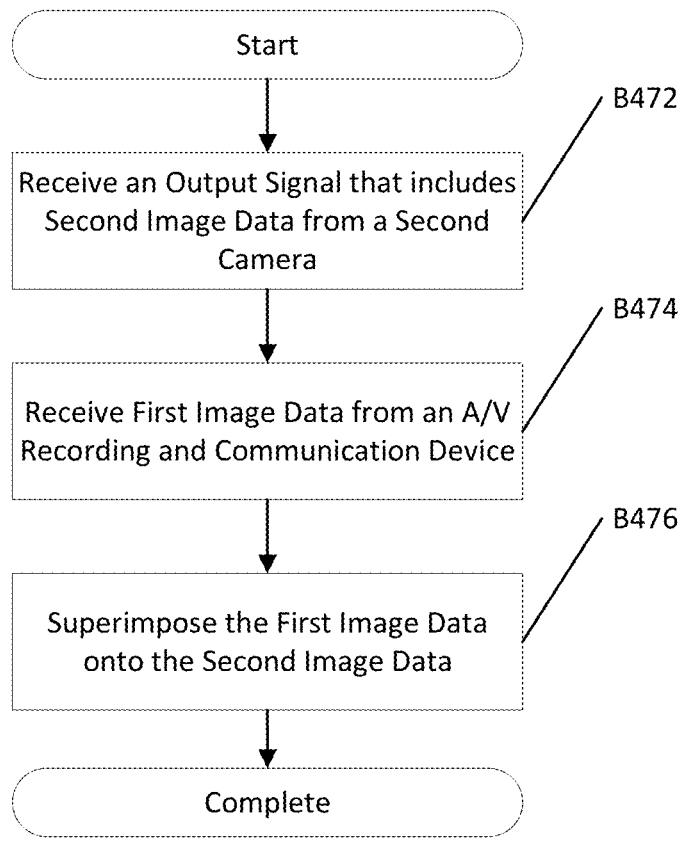
FIG. 24 is a flowchart illustrating an embodiment of a process for superimposing image data from two cameras according to various aspects of the present disclosure.

FIG. 24 is a flowchart illustrating an embodiment of a process 470 for superimposing image data by the backend server 312 according to various aspects of the present disclosure. In many embodiments, the first image data 338 captured by the first camera 318 of the A/V recording and communication device 302 may be superimposed with the second image data 352 captured by the one or more second cameras 310, 311. In some embodiments, the first image data 338 may be captured at a first resolution and the second image data 352 may be captured at a second resolution, where the first resolution is higher than the second resolution, as described above. In various embodiments, the second image data 352 may include a plurality of low-resolution frames that may be used to generate background footage of a scene. In some embodiments, the first image data 338 may include a plurality of high-resolution frames that may be used to determine at least one active motion block within the plurality of high-resolution frames, as further described below. In some embodiments, the second image data 352 may include image data from multiple second cameras 310, 311 that may be used to generate background footage that includes a wide-angle view including (but not limited to) a 360-degree view of the scene. Further, the first image data 338 may include image data captured by the first camera 318 of the A/V recording and communication device 302 pointed in a first direction, a second direction, and/or any other direction about a 360-degree rotation of the A/V recording and communication device 302. By combining at least one active motion block from the first image data 338 captured by the first camera 318 of the A/V recording and communication device 302 pointed in a particular direction (such as the second direction), with the background footage from the second image data 352, the backend server 312 may superimpose the first image data with the second image data. Further, in embodiments where the first resolution is higher than the second resolution, the superimposed image data may provide improved video footage quality by using higher resolution first image data for portions of the scene with motion and lower resolution second image data for portions of the scene with relative static portions.

Some of the present embodiments describe superimposing the first image data onto the second image data. Other ways of describing this aspect include stitching together the first image data and the second image data, or combining the first image data with the second image data.

In reference to FIG. 24, the process 470 may include receiving (block B472) an output signal 350 that includes second image data 352 from the one or more second cameras 310, 311 using the communication module 308. As described above, the one or more second cameras 310, 311 may be configured to be maintained in a powered-on state and continuously capture the second image data 352. In many embodiments, the backend server 312 may generate an orientation signal 337 and/or a power-up command signal 336 using the output signal 350 from the second camera(s) 310, 311, as further described above. Further, the backend server 312 may transmit the orientation signal 337 and/or the power-up command signal 336 to an A/V recording and communication device 302. In further reference to FIG. 24, the process 470 may also include receiving (block B474) first image data 338 captured by a first camera 318 of the A/V recording and communication device 302 using the communication module 308. In various embodiments, the first camera 318 of the A/V recording and communication device 302 may be in a low-power state and pointed in a first direction prior to receiving the orientation signal 337 and/or the power-up command signal 336 from the backend server 312, as further described above. In addition, the first camera 318 of the A/V recording and communication device 302 may be configured to capture the first image data 338 upon powering up from the low-power state using the power-up command signal 336 and pointing in the second direction using the orientation signal 337, as further described above. The process 470 may also include superimposing (block 476) a portion of the first image data 338 onto the second image data 352, or vice versa, as further described below. Again, superimposing may also be referred to as stitching or combining.

Figure 25:
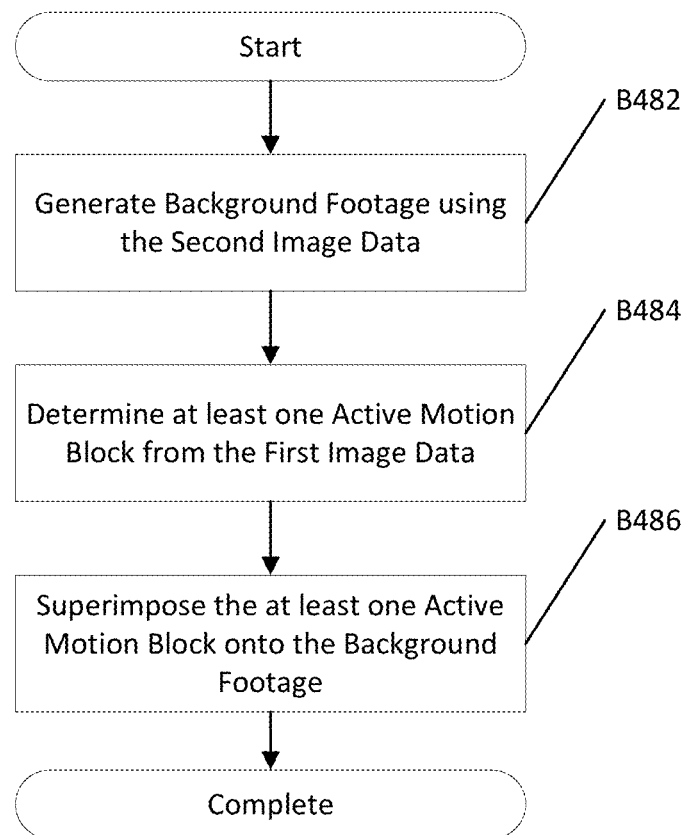
FIG. 25 is a flowchart illustrating an embodiment of a process for superimposing first image data from a first camera of an A/V recording and communication device onto second image data from a second camera device according to various aspects of the present disclosure.

FIG. 25 is a flowchart illustrating an embodiment of a process 480 for superimposing (block B476) the first image data 338 onto the second image data 352 according to various aspects of the present disclosure. In some embodiments, the first camera 318 may be configured to capture the first image data 338 at a first resolution and the second camera(s) 310, 311 may be configured to capture the second image data 352 at a second resolution, where the first resolution is higher than the second resolution. Further, the second image data 352 may include a plurality of low-resolution frames and the first image data 338 may include a plurality of high-resolution frames. In addition, image data such as the first image data 338 and second image data 352 may be a time sequence of frames, where each frame is composed of a grid of pixels. For example, a 1920×1080 frame has 1920 rows and 1080 columns with a pixel located at each intersection of a row and a column. Further, each pixel may have numerical values that correspond to color or chroma component (such as Cb, Cr) and a luma or brightness component (Y). Although different methods of pixel valuations exist, YCbCr is a widely used color space coding scheme. In this manner, the first image data 338 may include a plurality of high-resolution frames and the second image data 352 may include a plurality of low-resolution frames.

In reference to FIG. 25, the process 480 may include generating (block B482) background footage using the second image data 352. In various embodiments, the background footage may be generated by combining the plurality of low-resolution frames of the second image data 352 from each of the one or more second cameras 310, 311, where each second camera 310, 311 may contribute second image data 352 that includes a field of view that overlaps with various directions that the first camera 318 of the A/V recording and communication device 302 may be pointed. For example, the second image data 352 may include image data from multiple second cameras 310, 311, that may be used to generate background footage that includes a wide angle view including (but not limited to) a 360-degree view of the scene, such as (but not limited to) a 360-degree view about an axis that the first camera 318 of the A/V recording and communication device 302 may point (see FIG. 22). In other embodiments, the background footage may include second image data 352 with scene information corresponding to less than a 360-degree view of the scene. In other embodiments, the background footage may include second image data 352 corresponding to less than a 360-degree view of the scene but still include all directions that the first camera 318 of the A/V recording and communication device 302 may be capable of pointing.

In further reference to FIG. 25, the process 480 may also include determining (block B484) at least one active motion block from the first image data 338. In some embodiments, the at least one motion blocks may be determined by comparing pixel values of a first one of the high-resolution frames with corresponding pixel values of a second one of the high-resolution frames. For example, a person 501 may move about the premises as depicted in FIG. 22. By comparing pixel values of the first one of the high-resolution frames with corresponding pixel values of the second one of the high-resolution frame, the movement of the person 501 may be determined and the portion of the frame including the person 501 may be designated as an active motion block, as further described below. In some embodiments, the comparison between frames may include a tolerance level well known in the art to account for subtle movements that may not be of interest to the user and the overall advantages of the system. In some embodiments, the first image data 338 and/or second image data 352 may be encoded (e.g., pixel values are converted into a compressed format) using either an inter-frame and/or intra-frame compression methods well-known in the art. For example, the first image data 338 may be processed by applying a discrete cosine transform ("DCT") to encode spatial redundancy between frames. In some embodiments, the active motion blocks may be determined using the encoded data points such as (but not limited to) DCT values. In various embodiments, the active motion blocks may be select portions within a frame and may include the pixel values corresponding to the select portions within the frame. The process 480 may further include superimposing (block B486) the first image data 338 captured using the first camera 318 of the A/V recording and communication device 302 onto the second image data 352 captured using the second camera(s) 310, 311 by superimposing (block B486) the at least one active motion block onto at least one of the low-resolution frames of the background footage.

Figure 26:
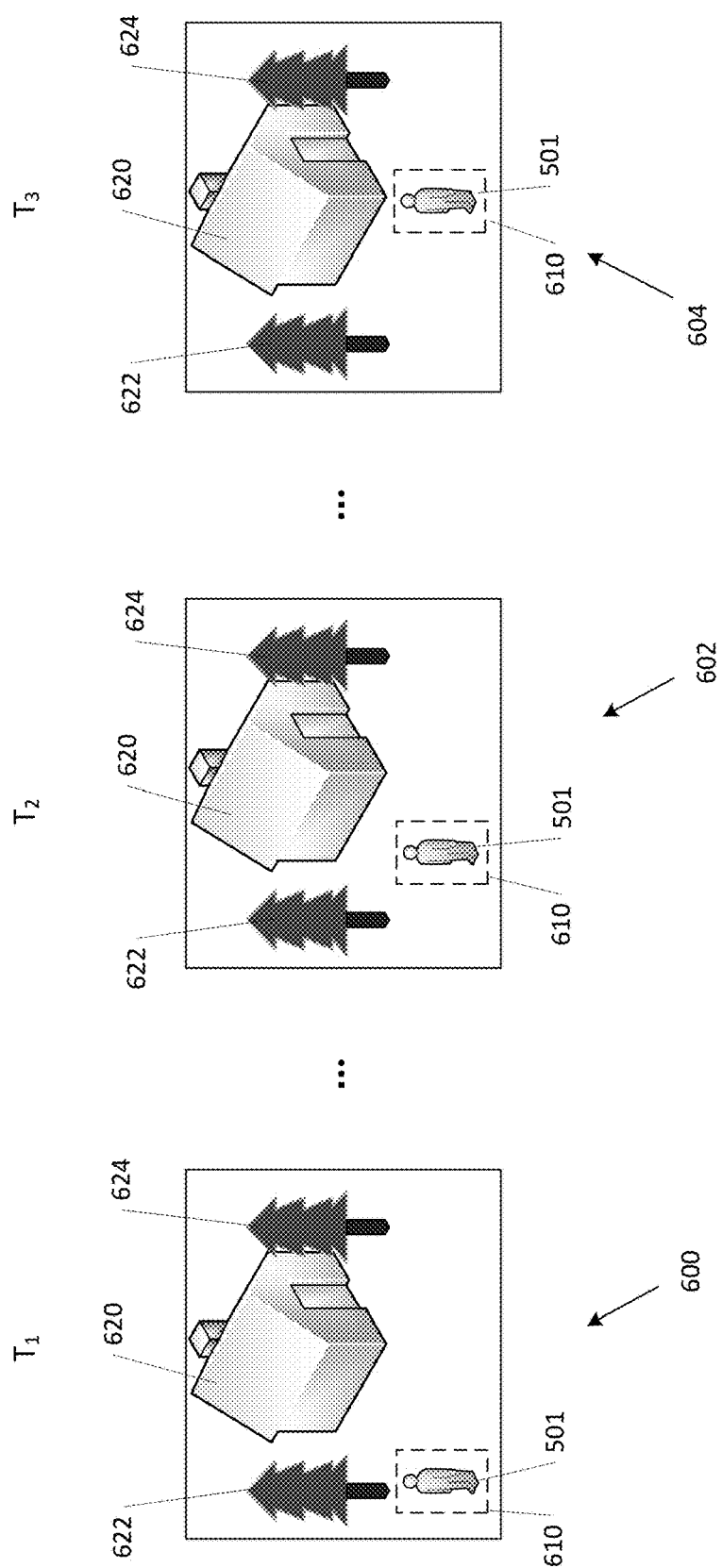
FIG. 26 is a diagram illustrating active motion blocks according to various aspects of the present disclosure.

FIG. 26 is a diagram illustrating a process for determining (block B484) active motion blocks 610 of the first image data 338 according to various aspects of the present disclosure. As described above, the first image data 338 may include a plurality of high-resolution frames 600, 602, 604. In some embodiments, the at least one active motion blocks 610 may be determined by comparing pixel values of a first one of the high-resolution frames with corresponding pixel values of a second one of the high-resolution frames. For example, a person 501 may move within a scene depicting a premises. At a first time $T_1$, frame 600 includes pixel values illustrating the first tree 622, the structure 620, the second tree 624, and the person 501. In frame 600, the person 501 is in front of the first tree 622 and not in front of the structure 620 or the second tree 624. At a second time $T_2$, frame 602 again includes pixel values illustrating the first tree 622, the structure 620, the second tree 624, and the person 501. However, the person 501 has moved closer toward the structure 620 and is now past the first tree 622. By comparing pixel values of frame 600 with corresponding pixel values of frame 602, the movement of the person 501 may be determined and the portion of the frame including the person 501 may be designated as an active motion block 610. In contrast, the pixel values of the first tree 622, the structure 620, and the second tree 624 have not changed from frame 600 to frame 602 and thus would not be included as part of the active motion block 610. To further illustrate, at time $T_3$, frame 604 shows that the person 501 has moved closer to the entrance of the structure 620. Again, by comparing pixel values of frame 602 with corresponding pixel values of frame 604, movement of the person 501 may be determined as an active motion block 610. In various embodiments, the active motion blocks 610 may be superimposed onto the low-resolution frames of the background footage, as described above. A person viewing the superimposed image data in the frames 600, 602, 604 would thus see the person 501 (in the active motion block 610 captured by the first camera 318 of the A/V recording and communication device 302) in high-resolution moving across the static background captured by the low-resolution second camera(s) 310, 311.

In further reference to FIG. 26, in some embodiments, the comparison between frames may include a tolerance level well known in the art to account for subtle movements that may not be of interest to the user and the overall advantages of the system. For example, if the trees 622, 624 move due to wind, the changes in pixel values between frames 600 and 602 corresponding to the trees 622, 624 may be within a tolerance level such that the portion of the frames 600, 602 that includes the trees 622, 624 are not determined to be active motion blocks 610. In some embodiments, the first image data 338 may be encoded (e.g., pixel values are converted into a compressed format) using either an inter-frame and/or intra-frame compression methods well-known in the art. For example, the first image data 338 may be processed by applying a discrete cosine transform ("DCT") to encode spatial redundancy between frames. In some embodiments, the active motion blocks 610 may be determined using the encoded data points such as (but not limited to) DCT values. Further, one of skill in the art would recognize that low-resolution frames 600, 602, 604 are for illustrative purposes only. For example, 10-15 seconds of first image data 338 would include many more high-resolution frames (depending on the frame rate per second) and the number of frames used to determine active motion blocks 610 may depend on the processing capacity and capabilities of the backend server 312.

As described above, the present embodiments advantageously connect at least one second camera in network communication with an A/V recording and communication device having a first camera. In various embodiments, the second camera and the A/V recording and communication device may also be in network communication with a backend server to enhance functionalities of the second camera and the A/V recording and communication device. For example, the second camera may be in a different geographic location from the A/V recording and communication device and thus enable functionalities that might not be possible if the first and second cameras were part of a single device. In some embodiments, the second camera could have different performance characteristics from the first camera, such as different resolution and/or different power consumption. The second camera may be a low-power, low-resolution camera that may be powered on at all times, while the first camera of the A/V recording and communication device may be a high-power, high-resolution camera that is maintained in a low-power state. The second camera may then be used in a process for pointing the high-power, high-resolution camera of the A/V recording and communication device from a first direction to a second direction and determining when to power up. This arrangement can have particular benefit in a battery-powered A/V recording and communication device, where conserving battery power is desirable to prolong the usable life of the device between battery charges. In addition, the backend server may more accurately determine locations of an object and/or person of interest using image data from both the first camera of the A/V recording and communication device and the one or more second cameras.

Figure 27:
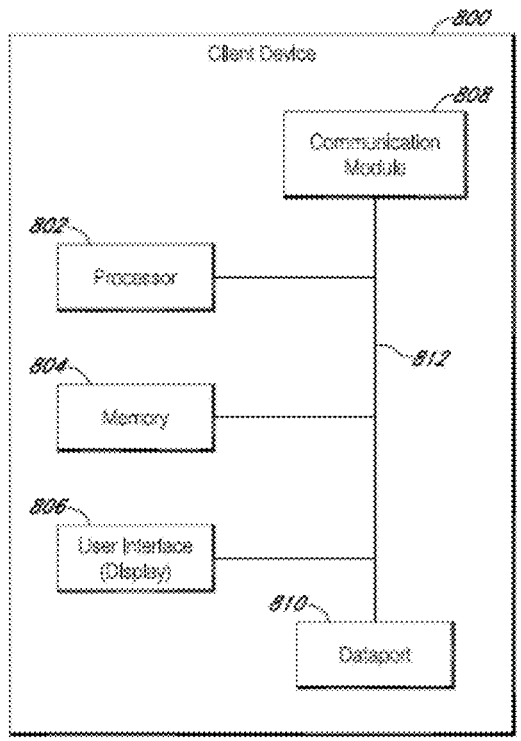
FIG. 27 is a functional block diagram of a client device on which the present embodiments may be implemented according to various aspects of the present disclosure.

FIG. 27 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 27, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 28:
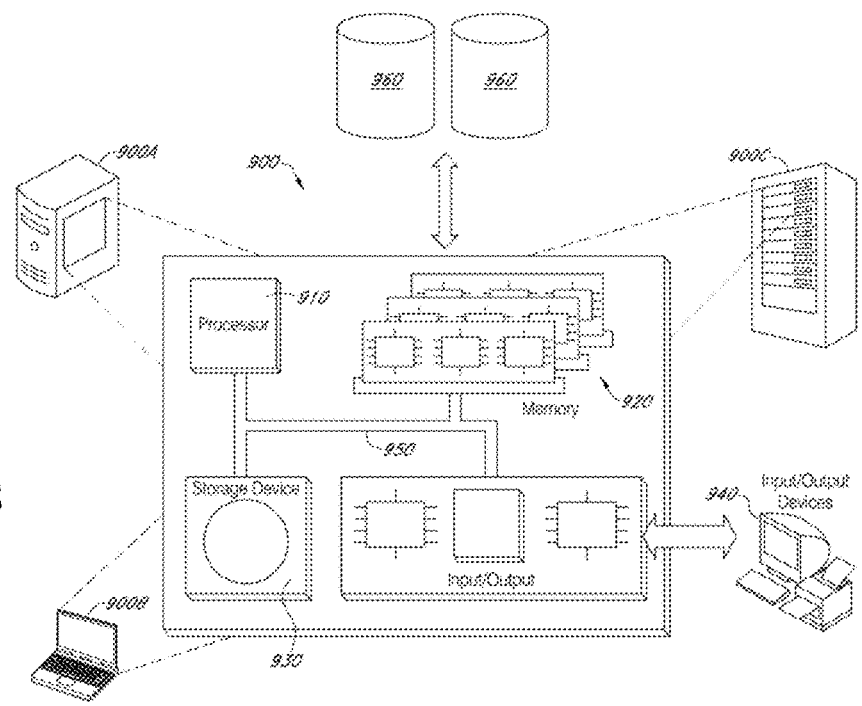
FIG. 28 is a functional block diagram of a general-purpose computing system on which the present embodiments may be implemented according to various aspects of present disclosure.

FIG. 28 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. An audio/video recording and communication device (A/V device) comprising:
    a first camera configured to capture first image data at a first resolution, wherein the first camera is pointed in a first direction;
    a communication module;
    a processor operatively connected to the first camera and the communication module, wherein the A/V device is in network communication with a server via the communication module; and
    a memory storing a camera application comprising instructions that, when executed by the processor, cause the A/V device to:
        maintain the first camera in a low-power state;
        receive a power-up command signal from the server based on an output signal from a second camera in network communication with the server;
        receive an orientation signal from the server based on the output signal from the second camera in network communication with the server; point the first camera in a second direction in response to the orientation signal from the server based on the output signal from the second camera, wherein the orientation signal includes a specific rotational degree relative to a fixed direction to point the first camera in the second direction;
        power up the first camera in response to the power-up command signal from the server based on the output signal from the second camera; and
        capture the first image data using the first camera in response to the power-up command signal from the server based on the output signal from the second camera.

2. The A/V device of claim 1, wherein the orientation signal and the power-up command signal are included in a single command signal.

3. The A/V device of claim 1, wherein the fixed direction is true north.

4. The A/V device of claim 1, wherein the specific rotational degree is relative to a position of the second camera.

5. The A/V device of claim 1, further comprising a motorized mount configured to point the first camera in the second direction in response to the orientation signal.

6. The A/V device of claim 5, wherein the motorized mount is configured to rotate the A/V device to point the first camera in any direction about a 360-degree rotational axis.

7. The A/V device of claim 1, wherein the camera application comprises further instructions, that when executed by the processor, further cause the A/V device to capture the first image data using the first camera for a predetermined length of time in response to the power-up command signal from the server based on the output signal from the second camera.

8. The A/V device of claim 1, wherein the second camera is configured to capture second image data at a second resolution.

9. The A/V device of claim 8, wherein the first resolution is higher than the second resolution.

10. The A/V device of claim 1, wherein the camera application comprises further instructions, that when executed by the processor, further cause the A/V device to transmit the first image data captured using the first camera to the server using the communication module.

11. A method for an audio/video recording and communication device (A/V device) comprising a first camera configured to capture first image data at a first resolution, wherein the first camera is pointed in a first direction, a communication module, and a processor operatively connected to the first camera and the communication module, wherein the A/V device is in network communication with a second camera via the communication module, the method comprising:
    maintaining the first camera in a low-power state;
    receiving a power-up command signal from the second camera; receiving an orientation signal from the second camera;
    pointing the first camera in a second direction in response to the orientation signal from the second camera, wherein the orientation signal includes a specific rotational degree relative to a fixed direction to point the first camera in the second direction;
    powering up the first camera in response to the power-up command signal from the second camera; and
    capturing the first image data using the first camera in response to the power-up command signal from the second camera.

12. The method of claim 11, wherein the orientation signal and the power-up command signal are included in a single command signal.

13. The method of claim 11, wherein the fixed direction is true north.

14. The method of claim 11, wherein the specific rotational degree is relative to a position of the second camera.

15. The method of claim 11, wherein the first camera is pointed in the second direction in response to the orientation signal using a motorized mount.

16. The method of claim 15, wherein the motorized mount rotates the A/V device to point the first camera in any direction about a 360-degree rotational axis.

17. The method of claim 11, further comprising capturing the first image data using the first camera for a predetermined length of time in response to the power-up command signal from the server based on the output signal from the second camera.

18. The method of claim 11, wherein the second camera is configured to capture second image data at a second resolution.

19. The method of claim 18, wherein the first resolution is higher than the second resolution.

20. The method of claim 11, further comprising transmitting the first image data captured using the first camera to a server using the communication module.

\* \* \* \* \*